(12) United States Patent
Kerr et al.

(10) Patent No.: US 9,615,347 B1
(45) Date of Patent: *Apr. 4, 2017

(54) LOCATION POSITIONING ENGINE SYSTEM AND METHOD

(75) Inventors: Michael A. Kerr, Reno, NV (US); David Stewart, Stateline, NV (US)

(73) Assignee: NEXRF Corp., Reno, NV (US)

(*) Notice: Subject to any disclaimer, the term of this patent is extended or adjusted under 35 U.S.C. 154(b) by 548 days.

This patent is subject to a terminal disclaimer.

(21) Appl. No.: 13/153,248

(22) Filed: Jun. 3, 2011

Related U.S. Application Data

(63) Continuation-in-part of application No. 12/821,852, filed on Jun. 23, 2010, now Pat. No. 8,738,024, and a continuation-in-part of application No. 12/413,547, filed on Mar. 28, 2009, now Pat. No. 8,942,995, and a continuation-in-part of application No. 11/948,007, filed on Nov. 30, 2007, now Pat. No. 9,373,116.

(60) Provisional application No. 61/351,677, filed on Jun. 4, 2010, provisional application No. 61/351,770, filed on Jun. 4, 2010, provisional application No. 61/352,242, filed on Jun. 7, 2010, provisional application No. 61/223,565, filed on Jul. 7, 2009, provisional application No. 61/040,661, filed on Mar. 29, 2008, provisional application No. 60/872,351, filed on Nov. 30, 2006.

(51) Int. Cl.
*H04W 64/00* (2009.01)

(52) U.S. Cl.
CPC .................... *H04W 64/00* (2013.01)

(58) Field of Classification Search
USPC ........................... 463/20, 30, 40, 42
See application file for complete search history.

(56) References Cited

U.S. PATENT DOCUMENTS

| | | | |
|---|---|---|---|
| 4,339,798 A | 7/1982 | Hedges et al. | |
| 4,856,787 A | 8/1989 | Itkis | |
| 5,586,937 A | 12/1996 | Menashe | |
| 5,594,491 A | 1/1997 | Hodge et al. | |
| 5,630,757 A | 5/1997 | Gagin et al. | |

(Continued)

FOREIGN PATENT DOCUMENTS

| | | |
|---|---|---|
| FI | WO2008065257 A1 | 6/2008 |
| JP | 2009025019 A | 2/2009 |

OTHER PUBLICATIONS

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.

(Continued)

*Primary Examiner* — Paul A D'Agostino
*Assistant Examiner* — Brandon Gray
(74) *Attorney, Agent, or Firm* — Michael A. Kerr; Kerr IP Group, LLC

(57) ABSTRACT

A system for associating content with geographic boundaries, determining the location of a wireless handset relative to the boundaries, and delivering targeted content to the wireless handset is described. The application is configured to determine the location of the wireless handset based on the strength of signals received from the network components by the wireless handset. The application then filters content items by boundary and delivers at least one content item to the wireless handset when the wireless handset is located within the boundary.

20 Claims, 18 Drawing Sheets

(56) References Cited

U.S. PATENT DOCUMENTS

| | | |
|---|---|---|
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,800,268 A | 9/1998 | Molnick |
| 5,851,149 A | 12/1998 | Xidos et al. |
| 5,871,398 A | 2/1999 | Schneier et al. |
| 5,902,983 A | 5/1999 | Crevelt et al. |
| 5,947,821 A | 9/1999 | Stone |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 | 1/2004 | Rowe |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Rasanen et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,029,349 B2 | 10/2011 | Lind |
| 8,172,684 B2 * | 5/2012 | Adiraju et al. ......... G07F 17/32 463/20 |
| 8,403,755 B2 | 3/2013 | Kerr |
| 8,492,995 B2 | 7/2013 | Maxik et al. |
| 8,506,406 B2 | 8/2013 | Kerr |
| 8,506,407 B2 | 8/2013 | Kerr |
| 8,523,679 B2 | 9/2013 | Kerr |
| 8,738,024 B1 | 5/2014 | Kerr et al. |
| 8,747,229 B2 | 6/2014 | Kerr |
| 8,942,995 B1 | 1/2015 | Kerr |
| 9,043,222 B1 | 5/2015 | Kerr et al. |
| 2001/0004768 A1 | 6/2001 | Hodge et al. |
| 2001/0005908 A1 | 6/2001 | Hodge et al. |
| 2001/0036224 A1 | 11/2001 | Demello et al. |
| 2001/0039210 A1 | 11/2001 | St-Denis |
| 2001/0044337 A1 | 11/2001 | Rowe et al. |
| 2002/0002073 A1 | 1/2002 | Montgomery et al. |
| 2002/0007494 A1 | 1/2002 | Hodge |
| 2002/0056125 A1 | 5/2002 | Hodge et al. |
| 2002/0056143 A1 | 5/2002 | Hodge et al. |
| 2002/0069105 A1 | 6/2002 | Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 * | 12/2002 | Ryan ........................... 705/14 |
| 2003/0009385 A1 | 1/2003 | Tucciarone et al. |
| 2003/0030666 A1 | 2/2003 | Najmi et al. |
| 2003/0032409 A1 | 2/2003 | Hutcheson et al. |
| 2003/0064805 A1 | 4/2003 | Wells |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 * | 11/2004 | Yamamura et al. ............ 463/30 |
| 2005/0046608 A1 | 3/2005 | Schantz et al. |
| 2005/0048990 A1 | 3/2005 | Lauriol |
| 2005/0085257 A1 | 4/2005 | Laird et al. |
| 2005/0114212 A1 | 5/2005 | Carrez et al. |
| 2005/0136949 A1 * | 6/2005 | Barnes, Jr. ................... 455/461 |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0246334 A1 | 11/2005 | Tao et al. |
| 2005/0261063 A1 | 11/2005 | Boyd et al. |
| 2006/0003830 A1 | 1/2006 | Walker et al. |
| 2006/0004627 A1 | 1/2006 | Baluja |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |
| 2006/0238382 A1 | 10/2006 | Kimchi et al. |
| 2006/0240891 A1 | 10/2006 | Klinkhammer et al. |
| 2006/0287810 A1 | 12/2006 | Sadri et al. |
| 2007/0008108 A1 | 1/2007 | Schurig et al. |
| 2007/0024580 A1 | 2/2007 | Sands et al. |
| 2007/0025265 A1 | 2/2007 | Porras et al. |
| 2007/0060306 A1 | 3/2007 | Amaitis et al. |
| 2007/0061229 A1 | 3/2007 | Ramer et al. |
| 2007/0087834 A1 | 4/2007 | Moser et al. |
| 2007/0100963 A1 | 5/2007 | Ban et al. |
| 2007/0136132 A1 | 6/2007 | Weiser et al. |
| 2007/0149215 A1 | 6/2007 | Misikangas |
| 2007/0149216 A1 | 6/2007 | Misikangas |
| 2007/0167210 A1 | 7/2007 | Kelly et al. |
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |

(56) References Cited

U.S. PATENT DOCUMENTS

| | | | |
|---|---|---|---|
| 2008/0057894 A1 | 3/2008 | Aleksic et al. | |
| 2008/0076572 A1* | 3/2008 | Nguyen et al. | 463/42 |
| 2008/0085692 A1 | 4/2008 | Hart et al. | |
| 2008/0096659 A1 | 4/2008 | Kreloff et al. | |
| 2008/0097858 A1 | 4/2008 | Vucina et al. | |
| 2008/0113785 A1* | 5/2008 | Alderucci et al. | 463/29 |
| 2008/0153515 A1 | 6/2008 | Mock et al. | |
| 2008/0162037 A1 | 7/2008 | Hasan | |
| 2008/0166973 A1 | 7/2008 | Hart et al. | |
| 2008/0167106 A1 | 7/2008 | Lutnick et al. | |
| 2008/0186234 A1 | 8/2008 | Alles et al. | |
| 2008/0189360 A1 | 8/2008 | Kiley et al. | |
| 2008/0207296 A1 | 8/2008 | Lutnick et al. | |
| 2008/0227473 A1 | 9/2008 | Haney | |
| 2008/0249833 A1 | 10/2008 | Ali et al. | |
| 2008/0252527 A1 | 10/2008 | Garcia | |
| 2008/0281668 A1 | 11/2008 | Nurminen | |
| 2009/0018929 A1 | 1/2009 | Weathers | |
| 2009/0150217 A1 | 6/2009 | Luff | |
| 2009/0197684 A1* | 8/2009 | Arezina et al. | 463/42 |
| 2009/0213771 A1 | 8/2009 | Celentano et al. | |
| 2009/0214036 A1 | 8/2009 | Shen et al. | |
| 2009/0298513 A1 | 12/2009 | Hampel et al. | |
| 2010/0022308 A1 | 1/2010 | Hartmann et al. | |
| 2010/0027521 A1 | 2/2010 | Huber et al. | |
| 2010/0039929 A1 | 2/2010 | Cho et al. | |
| 2010/0048242 A1 | 2/2010 | Rhoads et al. | |
| 2010/0063854 A1 | 3/2010 | Purvis et al. | |
| 2010/0121567 A1 | 5/2010 | Mendelson | |
| 2010/0167771 A1 | 7/2010 | Raghothaman et al. | |
| 2010/0179885 A1 | 7/2010 | Fiorentino | |
| 2010/0280960 A1 | 11/2010 | Ziotopoulos et al. | |
| 2010/0287033 A1 | 11/2010 | Mathur | |
| 2010/0302056 A1 | 12/2010 | Dutton et al. | |
| 2010/0305855 A1 | 12/2010 | Dutton et al. | |
| 2010/0331016 A1 | 12/2010 | Dutton et al. | |
| 2011/0078167 A1 | 3/2011 | Sundaresan et al. | |
| 2011/0103360 A1 | 5/2011 | Ku et al. | |
| 2012/0115512 A1 | 5/2012 | Grainger et al. | |
| 2012/0122476 A1 | 5/2012 | Lee et al. | |
| 2013/0003572 A1 | 1/2013 | Kim et al. | |

OTHER PUBLICATIONS

Wirelss Network. Wikipedia. http://en.wikipedia.org/wiki/Wireless_network. Nov. 17, 2008.
"Tracking Cookie." Wikipedia. http://en.wikipedia.org/wiki/Tracking_cookie. May 24, 2009.
Blom et al. "Transmission Power Measurements for Wireless Sensor Nodes and their Relationship to Battery Level." Symposium on Wireless Communication Systems. pp. 342-345, Sep. 7, 2005.
"Wi-Fi Location-Based Services—Design and Deployment Considerations." 2006 Cisco Systems. Accessed Dec. 2008. https://learningnetwork.cisco.com/docs/DOC-3418.
"Location in SIP/IP Core Architecture." Open Mobile Alliance. Sep. 4, 2008. Accessed Dec. 2008. http://www.openmobilealliance.org/technical/release_program/locsip_archive.aspx.
Youssef et al. "Location-Clustering Techniques for WLAN Location Determination Systems." 2006. http://wrc.ejust.edu.eg/papers/ijca.pdf.
Vegni et al. "Local Positioning Services on IEEE 802.11 Networks." Radio Engineering, pp. 42-47, vol. 17, No. 2, Jun. 2008.
Ladd et al. "On the Feasibility of Using Wireless Ethernet for Indoor Localization." IEEE Transactions on Robotics and Automation, pp. 555-559, vol. 20, Issue 3, No. 3, Jun. 2004.
Ladd et al. "Using Wireless Ethernet for Localization." IEEE/RJS International Conference on Intelligent Robots and Systems. 2002.
Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminals-using-rssi-between-terminals/330959.
Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.
Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.
Li et al. "A New Method for Yielding a Database of Location Fingerprints in WLAN" IEE Communications Proceedings, pp. 580-586, vol. 152, Issue 5, Oct. 7, 2005.
Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.
Muthukrishnan, et al. "Sensing motion using spectral and spatial analysis of WLAN RSSI." Proceedings of the 2nd European conference on Smart sensing and context. 2007. pp. 62-76.
Capkun et al. "Mobility Helps Peer-to-Peer Security." IEEE Transactions on Mobile Computing. vol. 5, Issue 1, pp. 43-51, Jan. 2006.
Milojicic et al. "Peer-to-Peer Computing" Jul. 10, 2002. https://www.hpl.hp.com/techreports/2002/HPL-2002-57R1.pdf.
"The New Normal of Retailing: The Rise of the Mobile Shopper." Next Generation Retail Summit. 2010. http://www.ngrsummit.com/media/whitepapers/Microsoft_NGRUS.pdf.
Lamarca et al. "Place Lab: Positioning Using Radio Beacons in the Wild." Pervasive 2005, LNCS 3468, pp. 116-133, 2005.
Borriello et al. "Delivering Real-World Ubiquitous Location Systems." Communications of the ACM. pp. 36-41, vol. 48, Issue 3, Mar. 2005.
Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.
Hightower et al. "Practical Lessons from the Place Lab." IEEE Pervasive Computing. pp. 32-39, vol. 5, Issue 3, Jul.-Spet. 2006.
Hile et al. "Indoor Location Estimation with Placelab." http://www.cs.washington.edu/education/courses/cse590gb/04wi/projects/hile-liu/. Jan. 8, 2004. Accessed on Sep. 25, 2008.
Kang "Extracting Places from Traces of Locations." ACM SIGMOBILE Mobile Computing and Communications Review. vol. 9, Issue 3, Jul. 2005.
Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201_6.
Otsason et al. "Accurate GSM Indoor Localization." Ubiquitous Computing 2005, LNCS 3660, pp. 141-158, 2005.
Chen et al. "Practical Metropolitan-Scale Positioning for GSM Phone." UbiComp 2006: Ubiquitous Computing Lecture Notes in Computer Science, 2006, vol. 4206/2006, pp. 225-242.
Varshavsky et al. "Are GSM Phones THE Solution for Localization?" 7th IEEE Workshop on Mobile Computing Systems and Applications, 2006. pp. 34-42, Aug. 1, 2005.
Chawathe et al. "A Case Study in Building Layered DHT Applications." Proceedings of the 2005 conference on Applications, technologies, architectures, and protocols for computer communications. vol. 35, Issue 4, Oct. 2005.
Lamarca et al. "Finding Yourself: Experimental location technology relies on Wi-Fi and cellphone signals instead of orbiting satellites." Dec. 2004. http://spectrum.ieee.org/computing/networks/finding-yourself.
Letchner et al. "Large-Scale Localization from Wireless Signal Strength." In Proceedings of the National Conference on Artificial Intelligence (AAAI), 2005.
Welbourne et al. "Mobile Context Inference Using Low-Cost Sensors." Location and Context-Awareness Lecture Notes in Computer Science, 2005, vol. 3479/2005, pp. 95-127.
Balakrishnan et al. "Lessons from Developing and Deploying the Cricket Indoor Location System." Nov. 7, 2003. http://www.sds.lcs.mit.edu/projects/cricket/V1Exp.pdf.

(56) References Cited

OTHER PUBLICATIONS

Cheng et al. "Accuracy Characterization for Metropolitan-scale Wi-Fi Localization." Proceedings of the 3rd international conference on Mobile systems, applications, and services. 2005.
"Ekahau Positioning Engine 4.2." 2008. http://www.nowire.se/images/produktblad/ekahau/datasheet_epe_42_en_11022008_lo.pdf. Sep. 29, 2008.
HTTP Cookie, redirected from tracking cookie as downloaded from wikipedia, 41 pages.
Interactive Gambling Industry Code, Dec. 2001, 7 pages.
Want et al. "The Active Badge Location System." ACM Transactions on Office Information Systems (TOIS) vol. 10. No. 1, pp. 91-102, Jan. 1992.
Wireless Network as downloaded from wikipedia.com, pages. 5 pages.

\* cited by examiner

Associate Content with User Group Attributes

Content Item: Casino Floor  /802
- 21 Tournament
- Casino Floor
- Room Service
- Rewards/Points

User Attribute Type: Age Range  /804
- Age
- Age Range
- Game
- Gender

User Attribute Value: 21 and over  /806
- 21 and over
- 25-34
- 35-44

Level: 1  /808
- 1
- 2
- 3

Relevance Weighting: 90  /810

Figure 8A

| Embodiment 1: Position Determination by Maximum Received Signal Strength Example 1 ||
|---|---|
| Beacon | Signal Strength |
| Beacon 1 | -45 dB |
| Beacon 2 | -50 dB |
| Beacon 3 | -60 dB |
| Wireless Handset located in Content Bubbles 1 and 2 ||

Figure 11A

| Embodiment 1: Position Determination by Maximum Received Signal Strength Example 2 ||
|---|---|
| Beacon | Signal Strength |
| Beacon 1 | -45 dB |
| Beacon 2 | -50 dB |
| Beacon 3 | -45 dB |
| Wireless Handset located in Content Bubbles 1 and 3 ||

Figure 11B

| Embodiment 2: Position Determination by Threshold Signal Strength<br>Example 1 ||
|---|---|
| Beacon | Signal Strength |
| Beacon 1 | -45 dB |
| Beacon 2 | -60 dB |
| Beacon 3 | -55 dB |
| Wireless Handset located in Content Bubbles 1 and 2 ||

Figure 11C

| Embodiment 2: Position Determination by Threshold Signal Strength<br>Example 1 ||
|---|---|
| Beacon | Signal Strength |
| Beacon 1 | -55 dB |
| Beacon 2 | -55 dB |
| Beacon 3 | -55 dB |
| Wireless Handset located in no Content Bubbles ||

Figure 11D

| Embodiment 2: Position Determination by Threshold Signal Strength and<br>Maximum Received Signal Strength<br>Example 1 ||
|---|---|
| Beacon | Signal Strength |
| Beacon 1 | -25 dB |
| Beacon 2 | -30 dB |
| Beacon 3 | -25 dB |
| Wireless Handset located in Content Bubbles 1, 2 and 3 ||

Figure 11E

LOCATION POSITIONING ENGINE SYSTEM AND METHOD

CROSS-REFERENCE

This patent application claims the benefit of provisional patent application 61/351,677 filed on Jun. 4, 2010;

this patent application also claims the benefit of provisional patent application 61/351,770 filed on Jun. 4, 2010;

this patent application also claims the benefit of provisional patent application 61/352,242 filed on Jun. 7, 2010;

this patent application is a continuation-in-part of patent application Ser. No. 12/821,852 filed on Jun. 23, 2010 that claims the benefit of provisional patent application 61/223,565 filed on Jul. 7, 2009;

this patent application is a continuation-in-part of patent application Ser. No. 12/413,547 filed on Mar. 28, 2009 that claims the benefit of provisional patent application 61/040,661 filed on Mar. 29, 2008;

this patent application is a continuation-in-part of patent application Ser. No. 11/948,007 filed on Nov. 30, 2007 that claims the benefit of provisional patent application 60/872,351 filed on Nov. 30, 2006; and the above patent applications hereby incorporated by reference in this patent application.

FIELD

The present invention relates to targeted delivery of content over one or more wireless networks. More particularly, the present invention relates to a system and method for determining the location of a wireless handset and delivering content to the handset based on its location.

BACKGROUND

The wireless handset presents new opportunities for merchants to communicate with customers. The merchant may wish to provide information to the customer regarding a product or service, offer incentives to the customer to enter a premises or make a purchase, or provide services that utilize the capabilities of the wireless handset.

When a merchant premises is large or the merchant offers a complex variety of products, the customer may require assistance to find a desired product or to attain the information needed about a product to make a purchase decision. An employee of the merchant may be able to provide the needed assistance provided the employee's training and knowledge is sufficient. If the employee is not available or unable to assist, the customer may use a web browser on a wireless handset to find additional information about a desired product or service. However, the small display and interface format of a wireless handset may hinder the customer's effort to use a wireless handset to find information. Thus, there is a need for a custom interface specific to the merchant's offerings, allowing the merchant to provide information to the customer in an efficient and easily navigable fashion.

A merchant wishing to advertise to the customer may wish to leverage the functionality of the customer's wireless handset by providing highly targeted advertising to the user. Although a merchant may use a sign or an LCD display to provide advertising at a specific location on the merchant premises, these advertising mechanisms will typically be directed at the entire range of potential customer demographics, due to the inability of these mechanisms to distinguish among customers. There is a need for a platform allowing the merchant to provide advertising to the customer taking into account the customer's location on or near the merchant premises and personal information about the customer which the customer has chosen to make available to the merchant.

Merchants having loyalty programs or other programs to increase interactions with the customer may rely on postal mail or e-mail to communicate with customers. However, the merchant lacks a means to incorporate the program into the customer experience on the merchant premises. Thus, there is a need for an application running on a wireless handset that allows a merchant to provide the benefits of the loyalty program to the customer while the customer is on or near the merchant's premises.

While the customer may realize a number of benefits from the solutions described above, the customer will be discouraged if the merchant's use of the application fails to meet the customer's needs or exceeds the customer's desire for the information that can be provided to the wireless handset. There is a need for a feedback system which allows the customer to chose or rank which of the provided information is desired and/or helpful. Such a feedback system would ensure that the customer and other future customers would continue to receive the most desirable and useful information provided by the merchant.

Further, customers may only be willing to share personal information that will allow the provided information to be targeted at the customer if the customer has control over what information is provided to the merchant. Thus, there is a need for an information privacy management system which the customer uses to control the information available to the merchant.

SUMMARY

A system for determining the location of a wireless handset within a premises is described. The system comprises a database, a wireless handset, a terminal, and a plurality of network components. The database is configured to store a plurality of content items, a plurality of content connections, at least one merchant premises map, at least one geographical boundary, and at least one location of a network component relative to the merchant premises map. The boundary surrounds a subdivision of the user premises. The wireless handset presents a first interface to the wireless handset user. The first interface enables the wireless handset user to create and edit a user profile comprising one or more user attributes. The user profile is stored in the database. The terminal presents a second interface to a content administrator. The second interface enables the content administrator to create and edit content items. The content items are stored in the database. The content connections associate at least one boundary with at least one content item. The content management system further comprises an application on the server. The application is configured to determine the location of the wireless handset based on the strength of signals received from the network components by the wireless handset. The application then filters content items by boundary and delivers at least one content item to the wireless handset when the wireless handset is located within the boundary.

In another embodiment, the system comprises a means for determining the location of the wireless handset based on the strength of signals received from the network components by the wireless handset.

A method for determining the location of a wireless handset within a premises is also described. The method comprises transmitting a user profile from a wireless handset to a server and transmitting a plurality of content items from a terminal to a server. The method further comprises storing at least one map of a merchant premises on a database residing on the server. The locations of a plurality of beacons relative to the at least one map are also stored on the database. The locations of a plurality of boundaries relative to the at least one map are also stored on the database. The database further stores a plurality of content connections. Some or all of the content connections associate one or more boundaries with one or more content items. The method further comprises determining the location of the wireless handset relative to the boundaries. The content items are filtered by boundary and the filtered content items are then delivered to the wireless handset.

FIGURES

The present invention will be more fully understood by reference to the following drawings which are for illustrative, not limiting, purposes.

FIGS. 8A-8B show an illustrative content administrator interface for creating content connections.

FIGS. 11A-11E show illustrative examples of wireless handset positions as determined from received signals.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A location positioning engine (LPE) for determining the location of a user's wireless handset within a premises is described. A content administrator submits a premises map to a server via a user interface. The content administrator then indicates the location of signal beacons on the premises with the user interface. As a user moves about a premises, signals from beacons distributed throughout the premises are received at the user's wireless handset. The content administrator uses the user interface to indicate content which the owner wishes for the user to receive when the user receives signals from the premises. The content information is stored on a server. The content is provided to the user's wireless handset from the server when the user's wireless handset detects that the user has entered the premises.

In some embodiments, the content administrator defines a content bubble comprising a geofence outlining all or a subset of the premises. The content administrator may indicate content to be received by a user when the user enters a content bubble within the premises.

In another embodiment, the content administrator may associate content with one or more user attribute. The user attribute may be stored on the server as information made available to the merchant by the customer through a user profile. Alternatively, the user attribute may be information the merchant has collected about or generated for a customer based on, for example, the customer's transactional history for the merchant.

The content administrator may further associate the content with a time range. The wireless handset communicates with a server to request content for the user. The server applies information stored in the user profile to make a determination of content to be targeted at the user. The server communicates with the wireless device to deliver the content.

Figure 1:
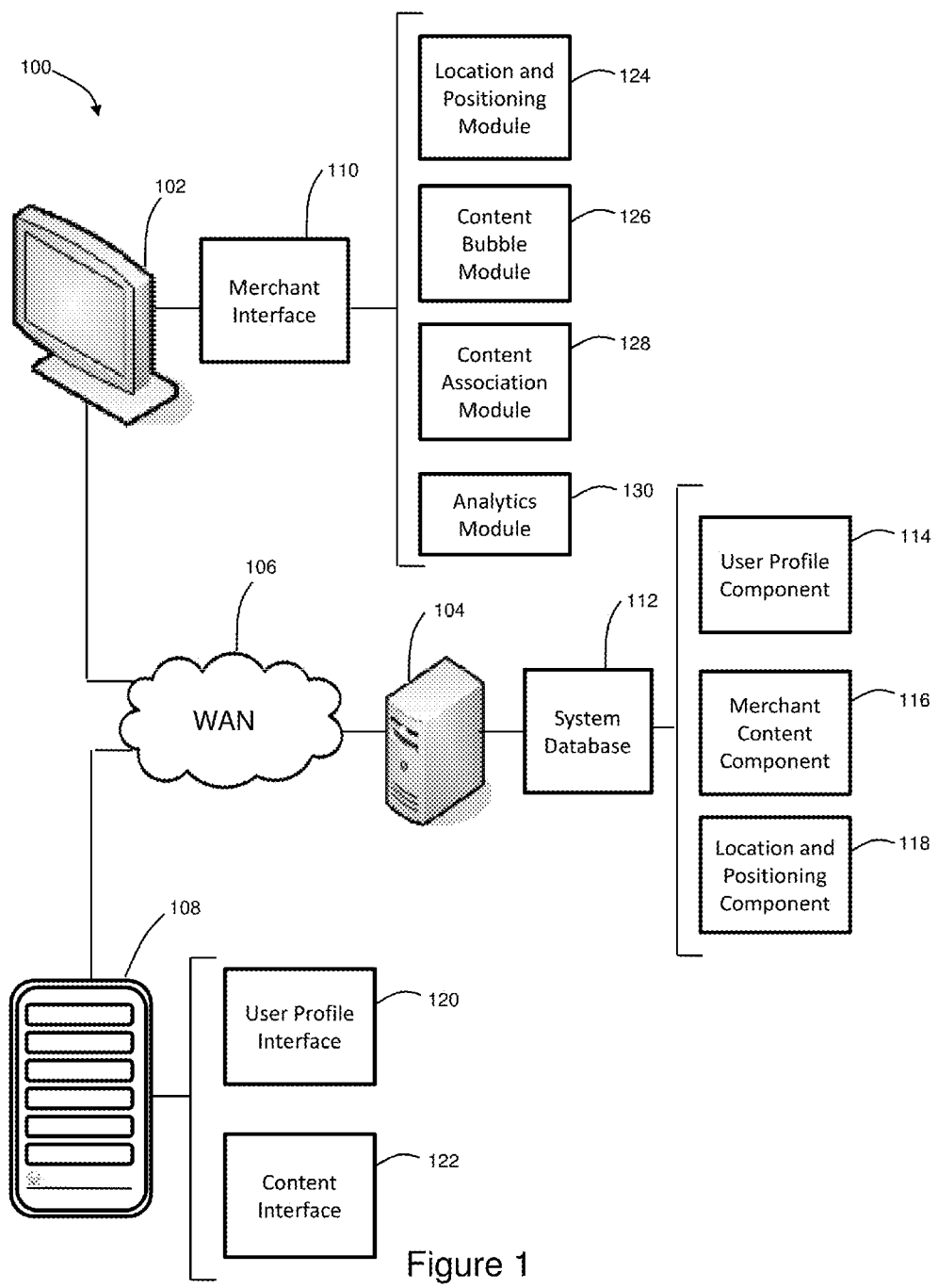
FIG. 1 shows an illustrative system architecture for a merchant content delivery system.

Referring to FIG. 1, an illustrative system architecture for a merchant content delivery system is shown. The system architecture comprises a merchant terminal 102, a server 104, a wireless network 106 and a wireless handset 108.

The merchant terminal 102 is a computing device capable of presenting a user interface to the content administrator for exchanging data with server 104. The merchant terminal may be, for example, a personal computer or a laptop.

The wireless handset 108 may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network, WLAN, Wi-Fi or WiMAX. It shall be appreciated by those of ordinary skill in the art that the term wireless handset, mobile handset, wireless phone, and mobile phone are interchangeable.

The wireless handset is in communication with an antenna. The antenna may be one of a plurality of base station antennas associated with a cellular phone network, or an antenna associated with wireless local area network access point, and may use Wi-Fi or WiMAX, or other such networking protocols.

Merchant terminal 102 and wireless handset 108 may be communicatively coupled to server 104 via wireless network 106 such as a wide area network. The wireless network could alternatively be a MAN, LAN or other network to facilitate the transmission of data between remote devices.

The software associated with merchant terminal 102 comprises a merchant interface application 110. The merchant interface application may be installed on the merchant terminal. Alternately, the merchant interface application may run on a remote source and accessed by the merchant terminal via the wireless network 106. For example, the merchant interface application may be accessed via an internet browser.

The software associated with the wireless handset 108 comprises a user profile interface 120 and a content interface 122. The user profile interface and the content interface may be components of a single application or may be separate applications. The content interface and user profile interface may run on the handset or may run on a remote source and accessed by the wireless handset via the wireless network 106. The user of the wireless handset uses the user profile interface to provide information about the user to merchants.

A system database 112 runs on Server 104. System database 112 comprises a user profile component 114, a merchant content component 116, and a location and positioning component 118. The user profile component 114 comprises user attributes provided by the user through the user profile interface 120. In some embodiments, the user profile component further comprises user attributes generated by the merchant. For example, the merchant may generate a user attribute indicating the transaction history for a user. The merchant content component 116 comprises information provided by the content administrator through the merchant interface 110. The location and positioning component comprises information regarding the location of network objects within the merchant premises. The location and positioning component may additionally store the location of geofences within the merchant premises. In some embodiments, the location and positioning component stores the location of a merchant premises relative to a street map.

The merchant interface 110 may comprise one or more interface modules, such as a location and positioning module 124, a content bubble generation module 126, a content association module 128, and an analytics module 130. The location and positioning module 124 allows a content administrator to indicate the location of one or more network objects on the merchant premises. The content administrator is a person who uses the merchant interface 110 to provide content server 104. The location of the transmitters and/or transceivers is stored in the location and positioning database 118. The location and positioning module 124 may further allow the content administrator to indicate the location of the merchant premises on a mapping application. The location of the merchant premises is also stored in the location and positioning database. The content bubble module 126 allows the content administrator to delineate an area comprising part or all of the merchant premises. Content bubbles are described in more detail below. The content association module 128 allows the content administrator to create content associations in the merchant content database 116. The content associations may include associations of content with user attributes stored in the user profile database 116 and associations of content with content bubbles. The associations between the merchant content and user attributes are stored in the merchant content database 116. Merchant content is provided from merchant content database 116 to content interface 122 via wireless network 106. In some embodiments, an analytics module 130 allows the merchant to collect statistical information regarding the user reactions to content received at content interface 122.

Figure 2:
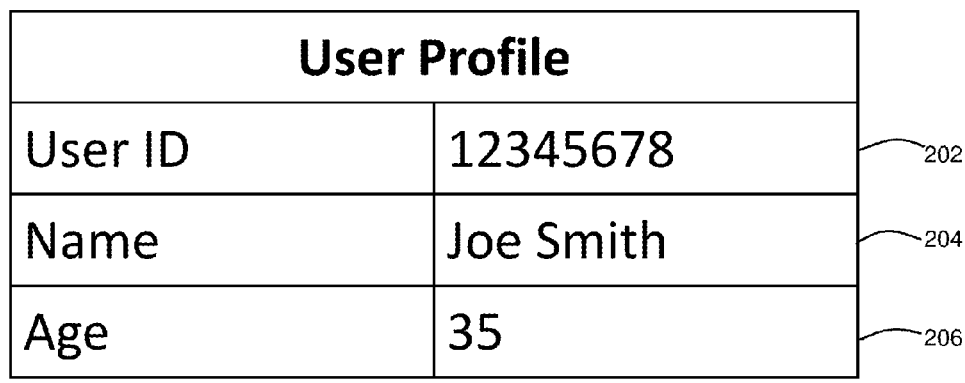
FIG. 2 shows an illustrative database table entry for a user profile.

Referring to FIG. 2, an illustrative database table entry 200 for a user profile is shown. The user profile table typically resides on server 104. The table may be populated by the user with information provided via a user profile interface 114 on the wireless handset 108. In some embodiments, the user enters user profile information using an interface on a home computer or other device having access to the internet. The user profile table may comprise fields to store information such as a user ID 202, name 204, and age 206. The profile table may store additional information such as a user address.

Figure 3A:
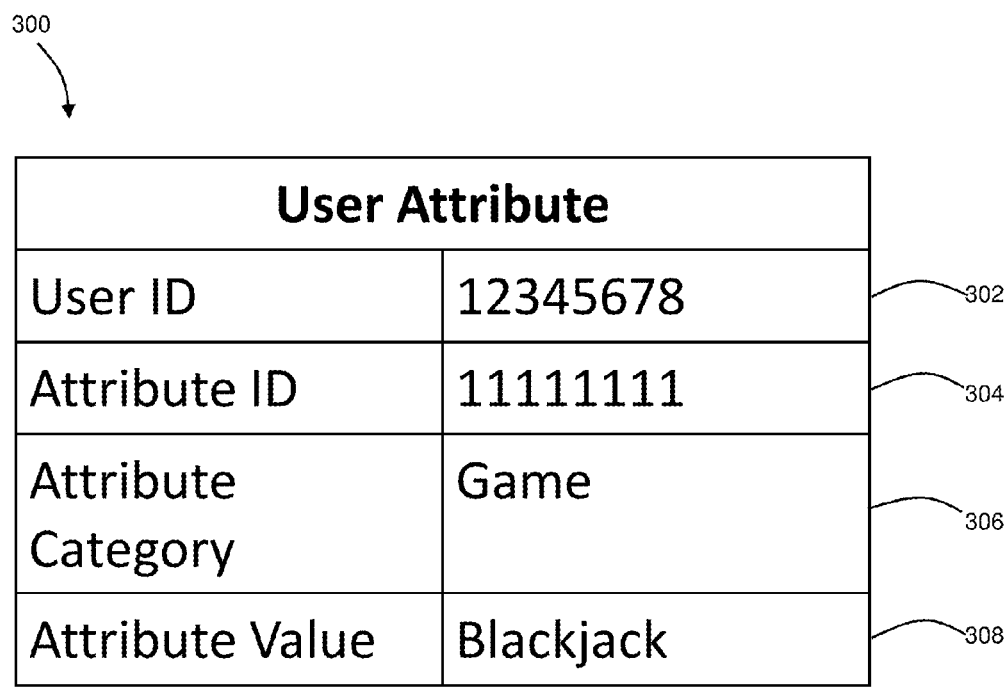
FIG. 3A shows an illustrative database table entry for a user attribute table.

Referring to FIG. 3A, an illustrative database table entry 300 for a User Attribute Table is shown. The user attribute table may be located on wireless handset 108 or on user profile component 114 of system database 112 on server 104. Locating the user attributes table on the wireless handset protects user privacy by maintaining information in a location where the user has control over the information. The user attribute table may comprise fields for storing a user ID 302, an unique attribute identifier 304, an attribute category 306, and an attribute value 308. Attributes may be linked to a single user in a many-to-one relationship through use of a user attribute table. Attribute category "Game" may have several attribute values associated with it, such as "Blackjack," "Poker," "Slots," and "Keno." Entry 300 links the user ID 202 of FIG. 2 with the attribute value "Blackjack". The data stored in entry 300 indicates that user 12345678 has an interest in the game blackjack. This is information that may have been provided by the user through an interface on a wireless handset 108 or other device. In some embodiments, the user attribute table comprises entries generated by a content administrator. For example, the user attributes table may contain an entry associating a user ID with attributes indicating the user's transactional history with the merchant.

In some embodiments, the user profile table and user attributes table are located on the wireless handset 108. Locating the tables containing user information on the wireless handset protects user privacy by storing information in a location where the user has control over the information.

Figure 3B:
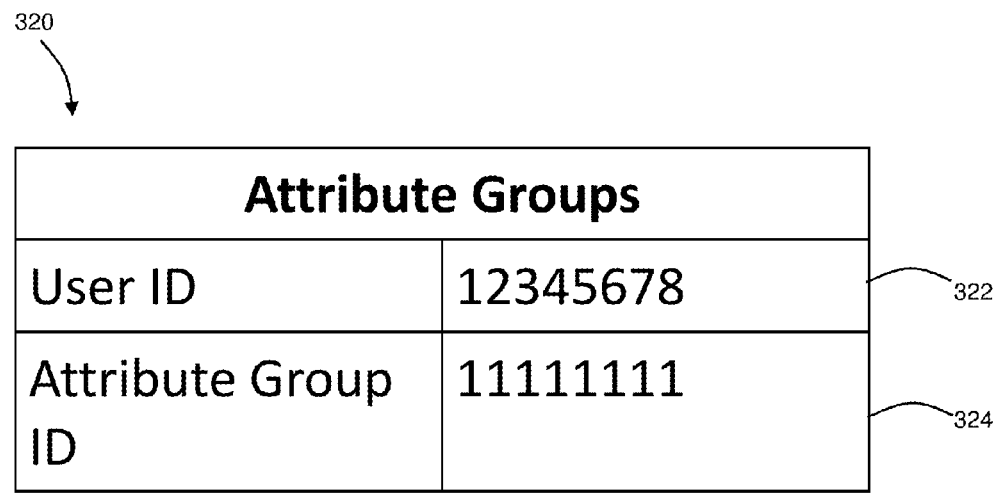
FIG. 3B shows an illustrative database entry for an attribute group table.

Referring now to FIG. 3B, an illustrative database table entry 320 for an Attribute Group Table is shown. Each entry in the attribute group table associates a user ID 322 with an attribute ID 324. The attribute group table may be populated with values stored in the User Attribute Table on a periodic basis, such as an hourly, daily, or weekly basis. In some embodiments, the attribute group table is updated every time the user attribute table is changed. The use of an attribute group table increases the efficiency of delivering content to users.

Figure 4:
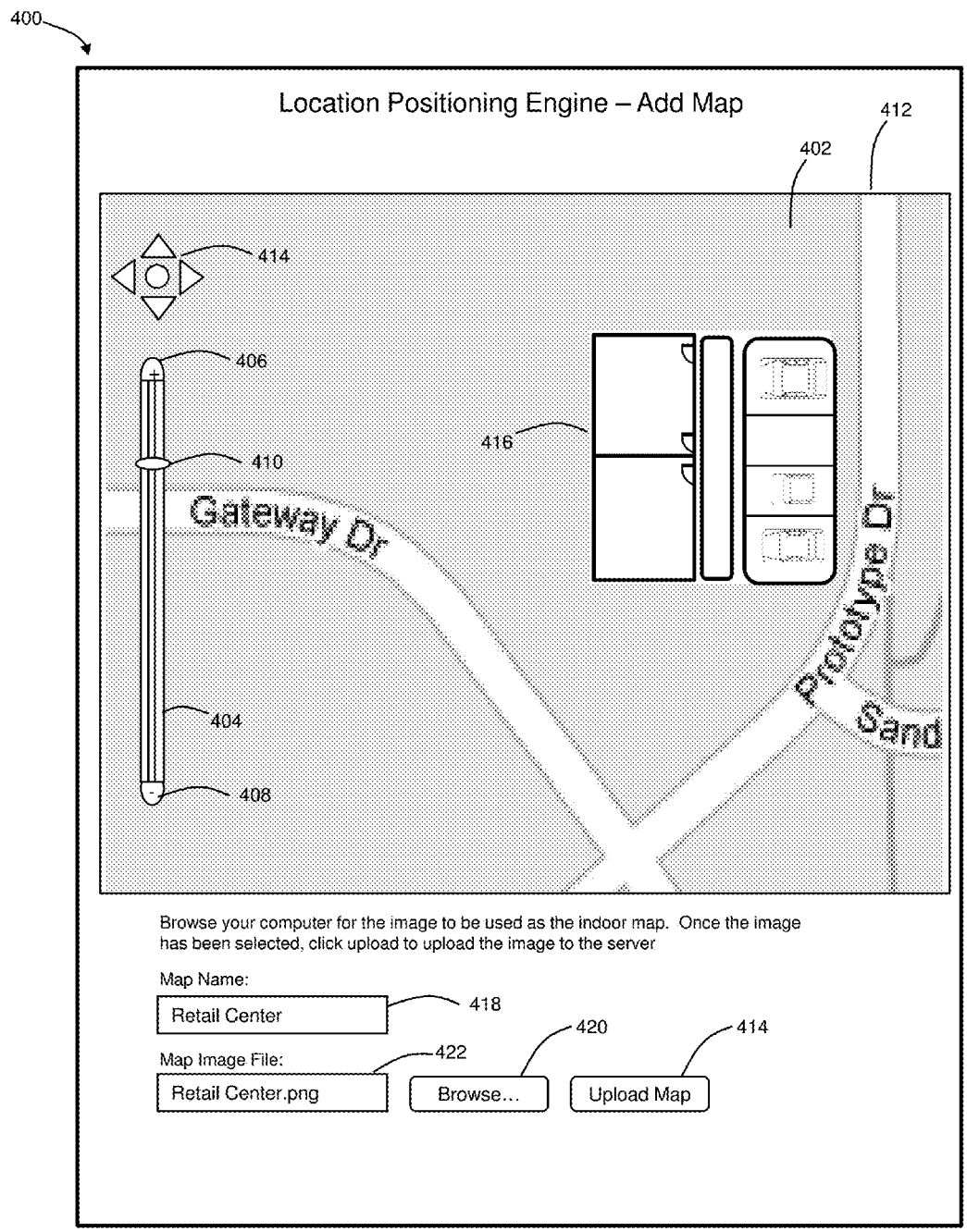
FIG. 4 shows an illustrative geographic information system interface.
Figure 5:
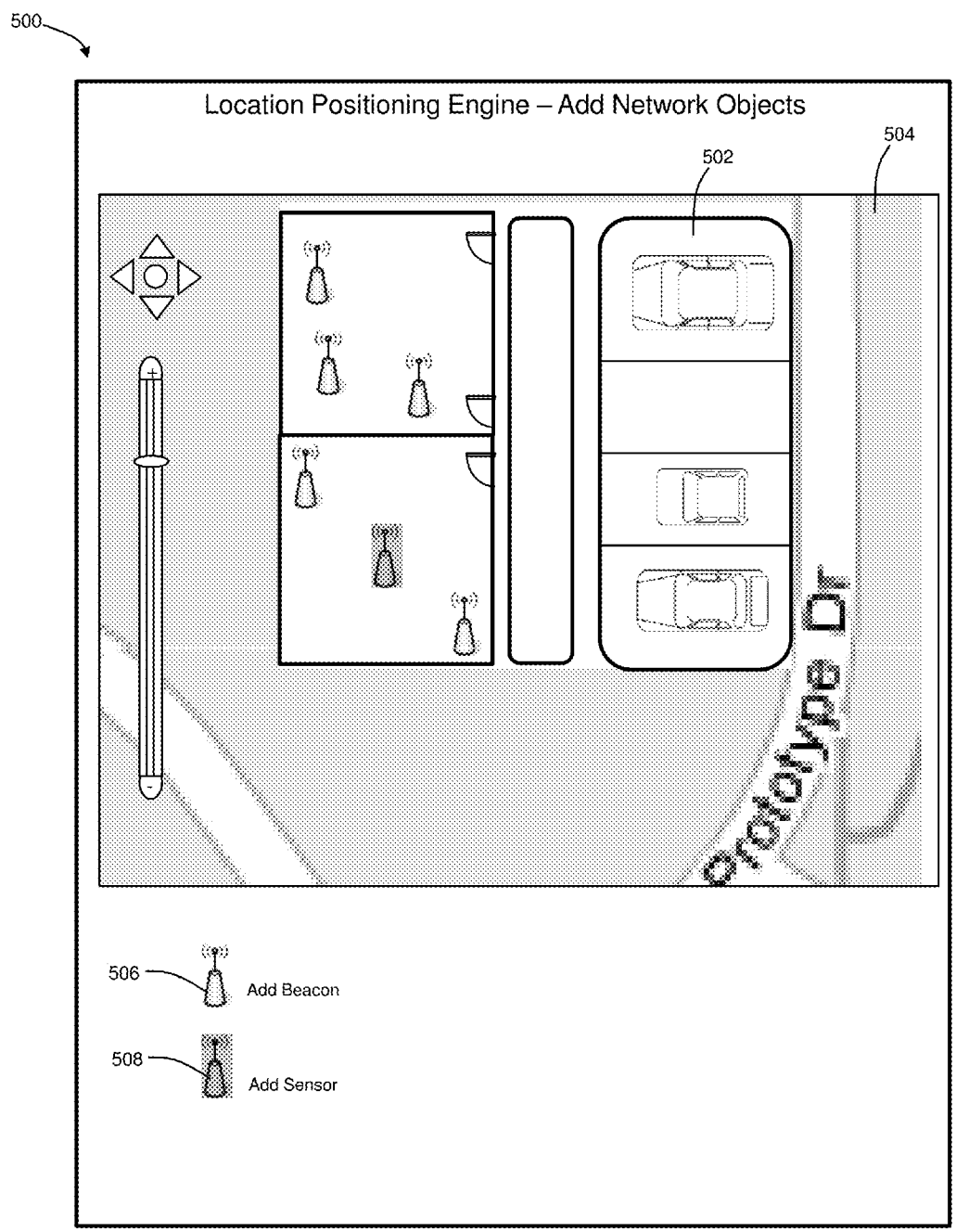
FIG. 5 shows an illustrative network object placement interface.

FIGS. 4 and 5 illustrate the location and positioning module 124 of the merchant interface 110. The location and positioning module comprises a geographic system interface and a network object placement interface.

Referring to FIG. 4, an illustrative geographic information system (GIS) interface 400 is shown. The content administrator may indicate the location of a map of the merchant premises relative to a street map using the GIS interface. The content administrator may use magnification bar 404 to adjust the magnification of street map 402 to the appropriate scale for placement of the merchant premises map. Magnification bar 404 comprises increase magnification indicator 406, decrease magnification indicator 408, and sliding magnification control 410. The content administrator may slide the sliding magnification control 410 in the direction of the increase magnification indicator 406 to increase the level of magnification of the map and may slide the sliding magnification control 410 in the direction of the decrease magnification indicator 408 to reduce the level of magnification of the map. To change the position of the street map 402 within map window 412, navigation control 414 may be used. Navigation control 414 comprises an up arrow, a down arrow, a left arrow and a right arrow. To move the street map in the desired direction, the arrow pointing in the desired direction is mouse clicked. Navigation may additionally or alternatively be accomplished by mouse clicking on street map 402, holding down the mouse button, and moving the mouse to slide the map in the desired direction. It will be recognized that other methods for adjusting map magnification and map position within the map window may be used.

When the appropriate level of magnification has been reached, the content administrator may insert a merchant premises map image 416 over the street map and position the premises map relative to the street map. The content administrator may be prompted to enter a name for the premises map in a text box such as map name text box 418. The content administrator selects a map image file to insert over the street map. For example, the content administrator may click a Browse button 420 to open a dialog box allowing the content administrator to choose a map image file from a file directory. When an image file has been selected, the name of the image file may appear in a text box as shown at 422. The content administrator may then upload the selected map, for example, by hitting an upload map button 414. After the map is uploaded, it appears within map window 412. The premises map image 416 may be resized and rotated with mouse controls or other interface controls. The content administrator may place the premises map image 416 in the appropriate position relative to street map 402. For example, the content administrator may place the premises map image by mouse clicking on the premises map image, holding down the mouse button, and dragging the premises map image to the desired position. It will be recognized that other methods for selecting a map image and positioning it at a desired location on a street map may be used. The position of premises map 416 relative to street map 402 is stored in the location and positioning component 118 of system database 112. The database may also store the level of magnification and position of street map 402 within map window 412. The image file or a string representing a path to the image file may also be stored in the database. Additionally, the map name entered in text box 418 may be stored in the database.

Referring to FIG. 5, an illustrative network object placement interface 500 is shown. The network object placement interface allows the content administrator to place network object icons on the merchant premises map to indicate the location of the network objects on the merchant premises. Network objects comprise beacons and sensors. A beacon transmits a signal containing identifying information to the wireless handset. A beacon may be, for example, an access point or femtocell. A sensor receives signals from one or more beacons and transmits beacon status information to server 104 via the wireless network 106. To add a beacon icon to the premises map 502, the content administrator mouse clicks the beacon icon 506 and a beacon icon appears in map window 504. The content administrator then drags the beacon icon to the desired location on merchant premises map 502. To add a sensor icon to the premises map, the content administrator mouse clicks the sensor icon 508 and a sensor icon appears in map window 504. The content administrator then drags the sensor icon to the desired location on merchant premises map 502. It will be recognized that a variety of other methods for indicating the location of network objects on a premises map may be used. The locations of any beacons or sensors placed on the premises map are stored in the location and positioning component 118 of system database 112.

Figure 6A:
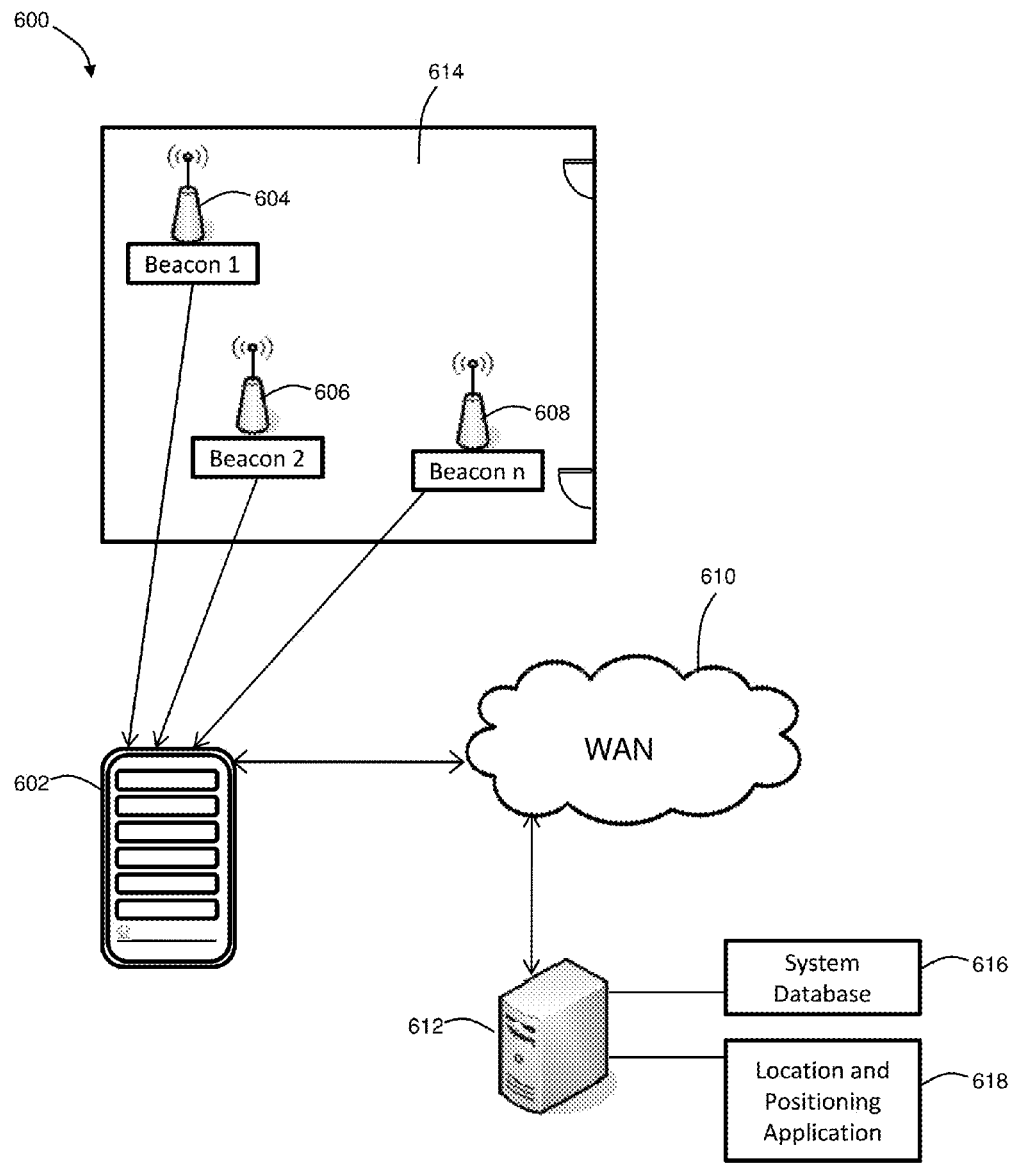
FIG. 6A-6B show illustrative system diagrams for a location positioning engine.

Referring to FIG. 6A, an illustrative system diagram 600 for a location positioning engine is shown. The location positioning engine comprises wireless handset 602, a plurality of beacons 604-608, wireless network 610, and server 612. A content administrator has indicated the location of beacons 604-608 on a merchant premises map 614 using, for example, the interface discussed in FIG. 5. As the wireless handset user moves through the premises indicated by premises map 614, the wireless handset 602 receives signals from one or more of the plurality of beacons 604-608. The wireless handset 602 sends information regarding the signals received from the beacons to server 612 via wireless network 610. Server 612 of FIG. 6A is the same server shown at 104 in FIG. 1 and contains the same system database comprising a location and positioning component 118.

In one embodiment, a location and positioning application 618 on server 612 receives from wireless handset 602 a Service Set Identifier (SSID) and signal strength value for each beacon from which the wireless handset received a signal. The application 618 compares the strength of the signals received at wireless handset 602. The application determines that the wireless handset is closest to the beacon from which the wireless handset received the signal having the greatest signal strength. The application uses beacon location information stored in the location and positioning component 118 of system database 616 to determine the location of the wireless handset relative to premises map 614.

In an alternative embodiment, location and positioning application 618 compares the strength of the signals received at wireless handset 602, and determines which of the signals exceed a predetermined threshold value (e.g. −50 dB). The application determines that the wireless handset is located proximate to the beacon from which a signal exceeding the threshold level was received.

In some embodiments, an application on the wireless handset 602 determines the location of the wireless handset relative to premises map 614 using signal strength information received from the beacons 604-608 and beacon location information retrieved from the location and positioning component 118 of system database 616 residing on server 612. The location may be determined on the basis of the strongest signal received at the wireless handset. Alternatively, the location may be determined on the basis of a comparison between the signals received and a predetermined threshold value.

Figure 6B:
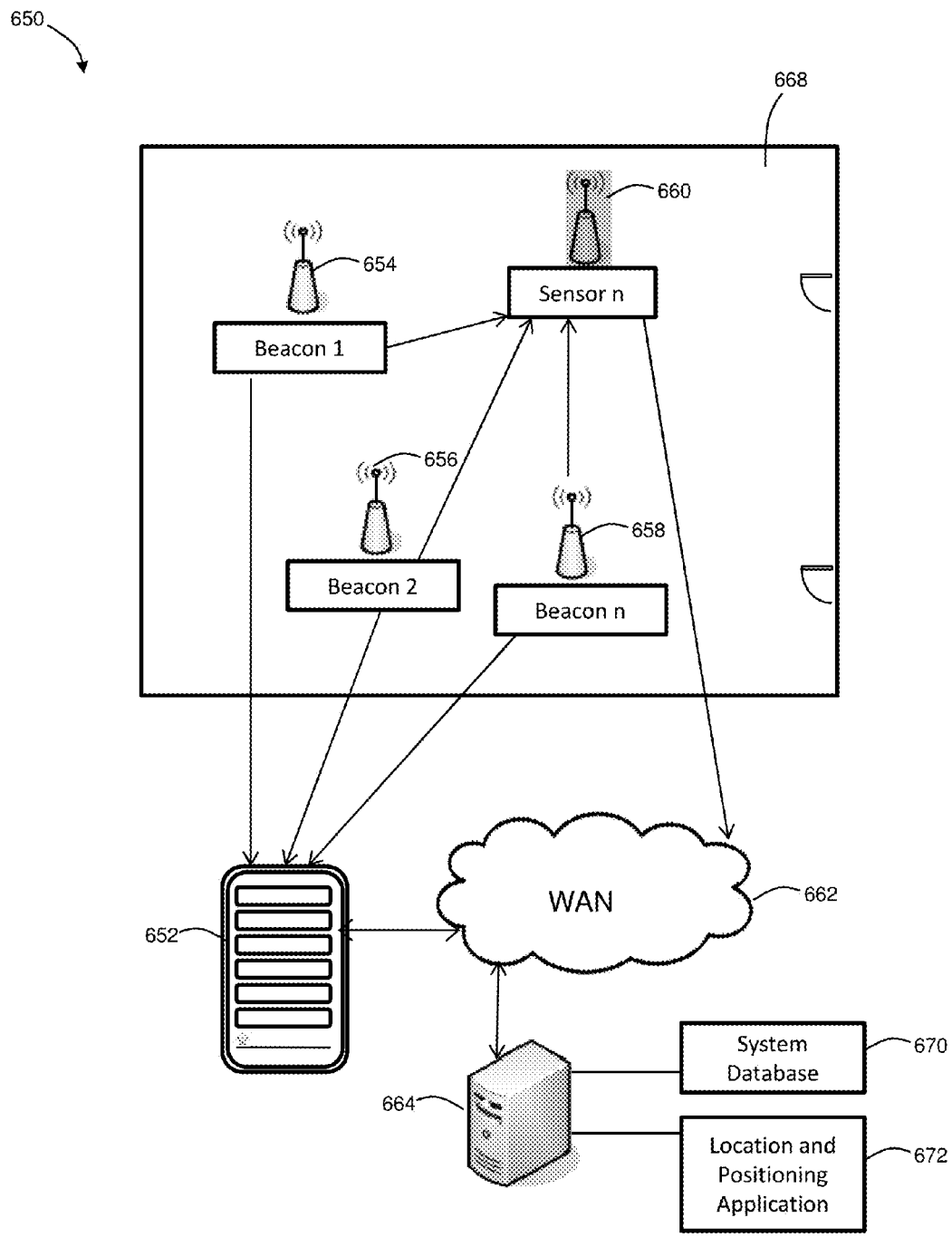

Referring to FIG. 6B, a second illustrative system diagram 650 for a location positioning engine is shown. The location positioning engine comprises wireless handset 652, a plurality of beacons 654-658, at least one sensor 660, wireless network 662, and server 664. A content administrator has indicated the location of beacons 654-658 and sensor 660 on a merchant premises map 668 using, for example, the interface discussed in FIG. 5. As the wireless handset user moves through the premises indicated by premises map 668, the wireless handset 652 receives signals from one or more of the plurality of beacons 654-658. The wireless handset 652 sends information regarding the signals received from the beacons to server 664 via wireless network 662. Server 664 of FIG. 6B is the same server shown at 104 in FIG. 1 and contains the same system database comprising a location and positioning component 118. Sensor 660 receives signals from one or more of the plurality of beacons 654-658. The sensor sends information regarding the signals received from beacons 654-658 to server 664 via wireless network 662. The information may be stored in system database 670. If one or more of beacons 654-658 is offline, sensor 660 relays the information to server 664. The beacon signal strength information provided by sensor 660 to server 664 may allow the location and positioning application 672 to update the position of beacons relative to premises map 668 as stored in location and positioning component 672 of system database 670 residing on server 664. Preferably, more than one sensor is used to determine the changed position of a beacon.

The position of wireless handset 652 relative to premises map 668 is determined in a similar manner to that described with reference to FIG. 6A by a location and positioning application 672 running on server 664 or an application running on handset 652. The addition of a sensor 660 allows for updated beacon status and location information which improves accuracy in the determination of the position of wireless handset 652.

Figure 7:
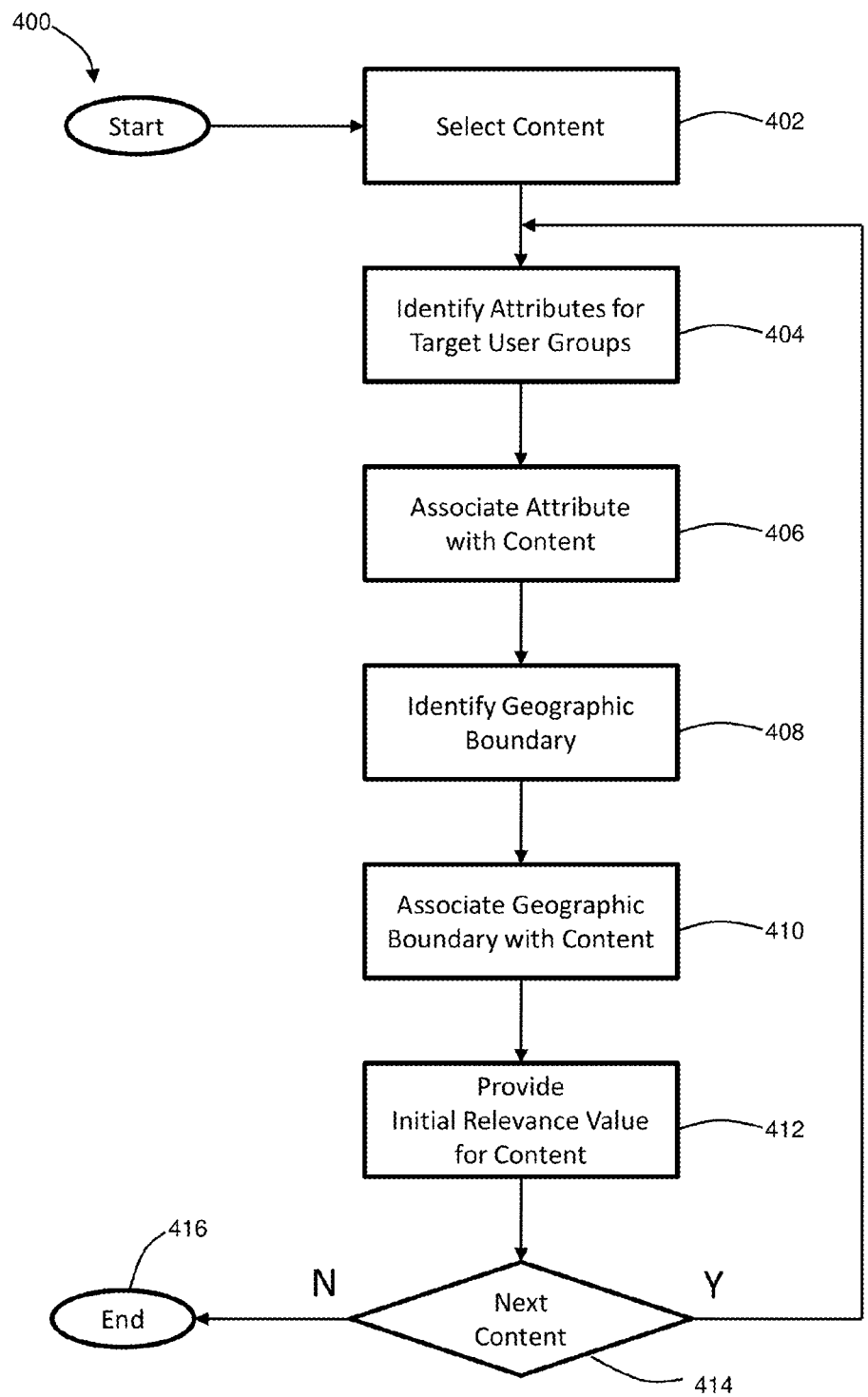
FIG. 7 shows an illustrative flow chart for associating content with one or more geographic boundaries and optionally one or more user attributes.

Referring to FIG. 7, an illustrative flow chart for associating content with a user attribute is shown. The method begins at block 402, in which the content administrator chooses a content item. A content item may be any information or product promotion which the merchant shares with a user. For example, content may include a product location, product details, event information, or a coupon. A content item may also be a link to one or more content items, such as a restaurant menu that links to a list of menu items. In some embodiments, a content item may be an application, such as a purchasing or gaming interface.

The method proceeds to block 404, in which the content administrator optionally identifies user group attributes to associate with a content item. For example, if a content item "Casino Floor" was selected at block 402, the content administrator may wish to associate group attributes indicating an interest in gaming activities with the content item. The content item "Casino Floor" may be a link leading to a list of casino floor activities, such as a 21 Tournament. The content administrator may wish to associate user attributes indicating an interest in the game blackjack with the content item 21 Tournament. At block 406, the content administrator associates the selected user attributes with the selected content item.

In some embodiments, the merchant is prevented from accessing some or all of the information stored in the user profile. User privacy may be protected by restricting merchant access to sensitive user information. For example, the merchant may be able to determine how many users fall within a particular age range without being able to access the user attribute indicating user age for a particular user.

At block 408, the content administrator uses content bubble module 125 to define a geofence on or near a merchant property. The geofence is a virtual boundary line enclosing part or all of a merchant space. The area within the geofence is described as a content bubble because the content administrator may associate the geofenced area with one or more content items. Content bubbles are described further below with reference to FIG. 6. At block 410, the content administrator may associate a content bubble defined by the geofenced area with the selected content.

At block 412, the content administrator provides an initial relevance value for the content item. The initial relevance value indicates the applicability of the selected content item for the selected group attribute as perceived by the content administrator. For example, for the content item 21 Tournament, the content administrator may assign a higher initial relevance value for the user attribute value blackjack than the content administrator would assign for the user attribute value poker, since a user who has indicated an interest in blackjack may be more likely to be interested in a 21 Tournament than a user who has indicated an interest in poker.

At decision diamond 414, the content administrator may proceed to the next content item if the content administrator wishes to associate a next content item with a next user attribute value. If the content administrator has made all assignments, the method ends.

In some embodiments, the content administrator may also exclusively associate a group attribute with a content item. For example, if the content administrator intends for the content item Room Service to be hidden from users who are not staying in a room on the premises, the content administrator may exclude such users from receiving the content item. The group attribute corresponding to users not staying on the premises is excluded from association with the content item Room Service.

Figure 8B:
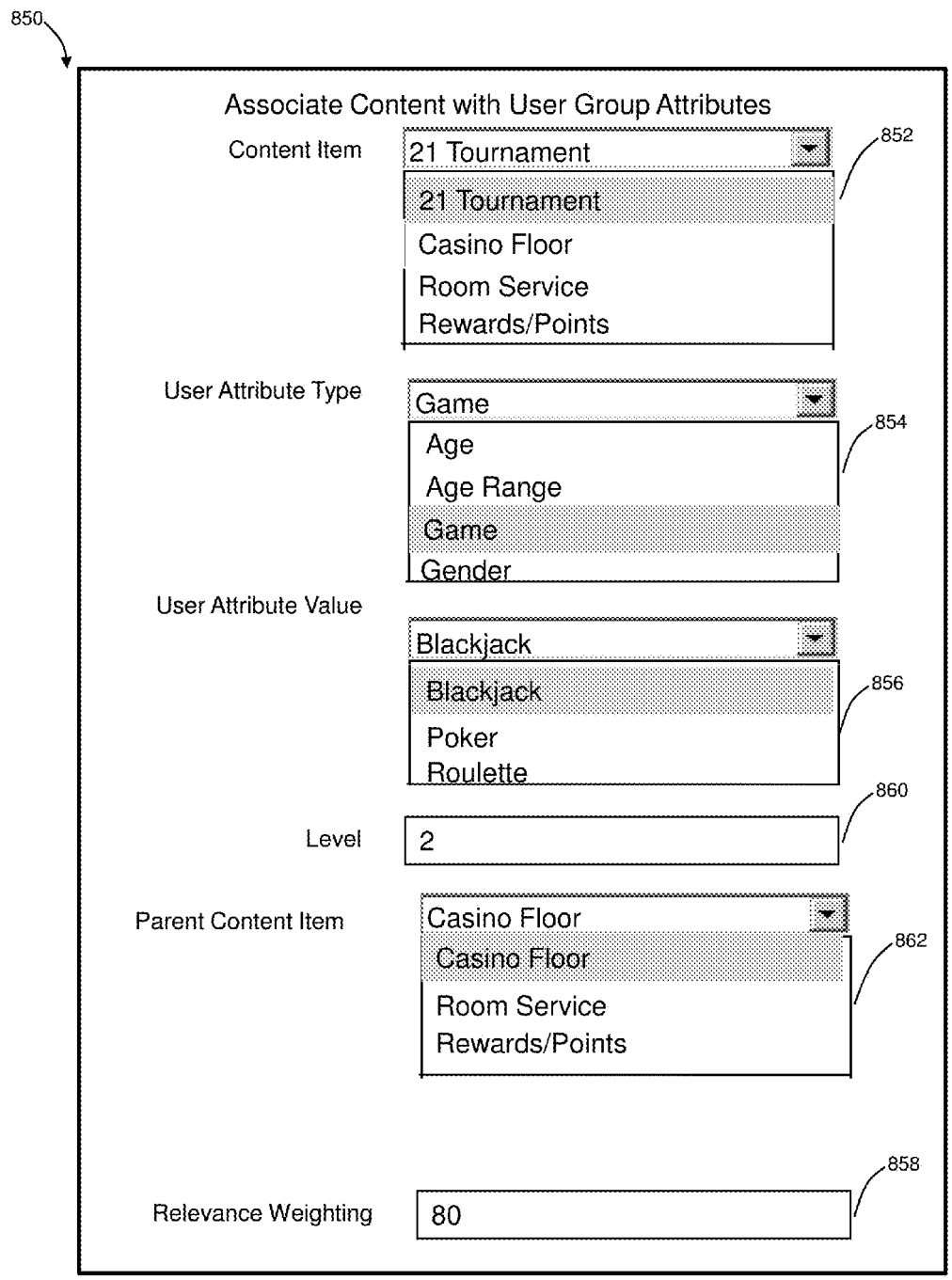

Referring to FIG. 8A, an illustrative content administrator interface 800 for creating content connections is shown. The content administrator may use the interface shown in FIGS. 8A-8B to carry out optional association of content items with user attributes as indicated in FIG. 7. The content administrator selects a content item from a predefined list of content items as shown in the drop down menu 802. The list of content items is comprised of content previously uploaded by the content administrator and stored in the database. In the illustrative example shown in FIG. 8A, the content administrator has chosen the content item "Casino Floor."

The content administrator chooses a group attribute to associate with the content item using drop down menus 804 and 806. At menu 804, the content administrator chooses attribute type "Age Range." In menu 806, the content administrator has selected the attribute value "21 and over" to associate with the selected content item. Only those users who are above the age of 21, as indicated in the user profile stored in the user profile component 114 of system database 112, will receive the content specified in menu 802.

In some embodiments, the merchant may associate content items with merchant generated attributes. Merchant generated attributes are attributes associated with a user that were not specified by the user. For example, a merchant generated attribute may include past user gaming history, such as a history of using slot machines.

The content administrator is provided with a level menu 808. The level indicates whether the content item is a parent item, such as a standalone link or a link to a submenu, or a child item, such as a submenu content item. As shown at 808, the content administrator has specified that content item Casino Floor is a level 1 item. This indicates that the Casino Floor content item is a top level content item which may serve as a parent to a set of lower level content links.

The content administrator may assign an initial relevance value to the content-attribute association created in tables 802-806. The initial relevance value may be a numerical value, such as a number falling in the range of 1-100, with 1 indicating minimum relevance and 100 indicating maximum relevance. As shown in 810, the content administrator has chosen an initial relevance weighting value of 90.

Referring to FIG. 8B, a second illustrative content administrator interface 850 for creating content connections is shown. The content administrator may desire to associate content items comprising a submenu to a top level content item. For example, the content administrator may wish to create a submenu for content item Casino Floor. The submenu may contain, for example, content item "21 Tournament." To create the submenu, the content administrator selects the desired submenu content item from Content Item menu 852. The content item 21 Tournament has been selected from Content Item menu 852. The content administrator then creates content connections to associate one or more user attributes with the content item. For example, in drop down menu 854, the content administrator has chosen the user attribute type Game. The content administrator may wish to associate the content item(s) with an attribute type without specifying an attribute value. For example, the content administrator may choose to associate the selected content item 21 Tournament with all users who have selected user attribute type Game.

Alternatively, the content administrator may wish to associate the selected content items with a group attribute having a particular value. In menu 856, the content administrator has selected the attribute value "Blackjack" to associate with the selected content items. Only those users who have indicated an interest in Blackjack through the user attributes associated with their user profiles will receive the content specified in menu 852.

To indicate that the content item selected, 21 Tournament, is linked to a parent content item, the content administrator sets the level to a value that is one greater than the value of the parent level. Thus, since 21 Tournament is an item in a submenu of menu item Casino Floor, 21 Tournament is give a level value of 2, which is one greater than the Casino Floor level value of 1. If the level value is greater than one, a Parent Content Item menu appears as shown at 862. The parent content item menu is populated with all content items having a level value that is one fewer than the level value specified in 860. Thus, since Casino Floor was given a level value of 1, which is one fewer than the level value specified in 860, the content item Casino Floor appears in the Parent Content Item menu. The content administrator chooses the parent content item, for example, Casino Floor, to assign the level 2 content item 21 Tournament to level 1 content item Casino Floor.

If the content administrator wishes to create additional level 2 submenu items under level 1 menu item Casino Floor, the content administrator adds new content item associations, specifying a level value of 2 and a parent item of Casino Floor. The content administrator may also create submenus of submenus by creating a level 3 content item and specifying a level 2 parent content item for the level 3 content item.

As for the parent content items, the content administrator may assign an initial relevance value to the child content item. As shown in 858, the content administrator has chosen an initial relevance weighting value of 80.

In FIG. 8B, the content administrator has selected "21 Tournament" from the submenu items list. A user in the age group 21 and over may receive the content item Casino Floor on the user's wireless handset, as established in the interface shown in FIG. 8A. If the user selects Casino Floor, the user will be shown a submenu comprising the content item "21 Tournament," as established in the interface shown in FIG. 8B.

In some embodiments, the content administrator is able to associate additional filters with the content item user attribute association. The content administrator may wish to serve content to a user based on a time range, date, or user location. For example, the content administrator may associate a content item such as a coupon for coffee with a time range, such as 7:00 AM to 11:00 AM, so that the coupon is delivered to users during this time range. In a second example, the content administrator associates a coupon for coffee with a time range and with a user attribute indicating a user preference for coffee. In the second example, only those users that have specified a preference for coffee receive the coffee coupon content item during the specified time range. Content may be filtered by user location based on information provided by the user's wireless handset to the server regarding the user's location. In some embodiments, the content administrator may associate a content item with a time, date, location, or other filter without associating the content item with a user attribute. In other embodiments, the content administrator may be able to provide content items to all users by indicating no filter is to be applied to such content items.

Figure 9:
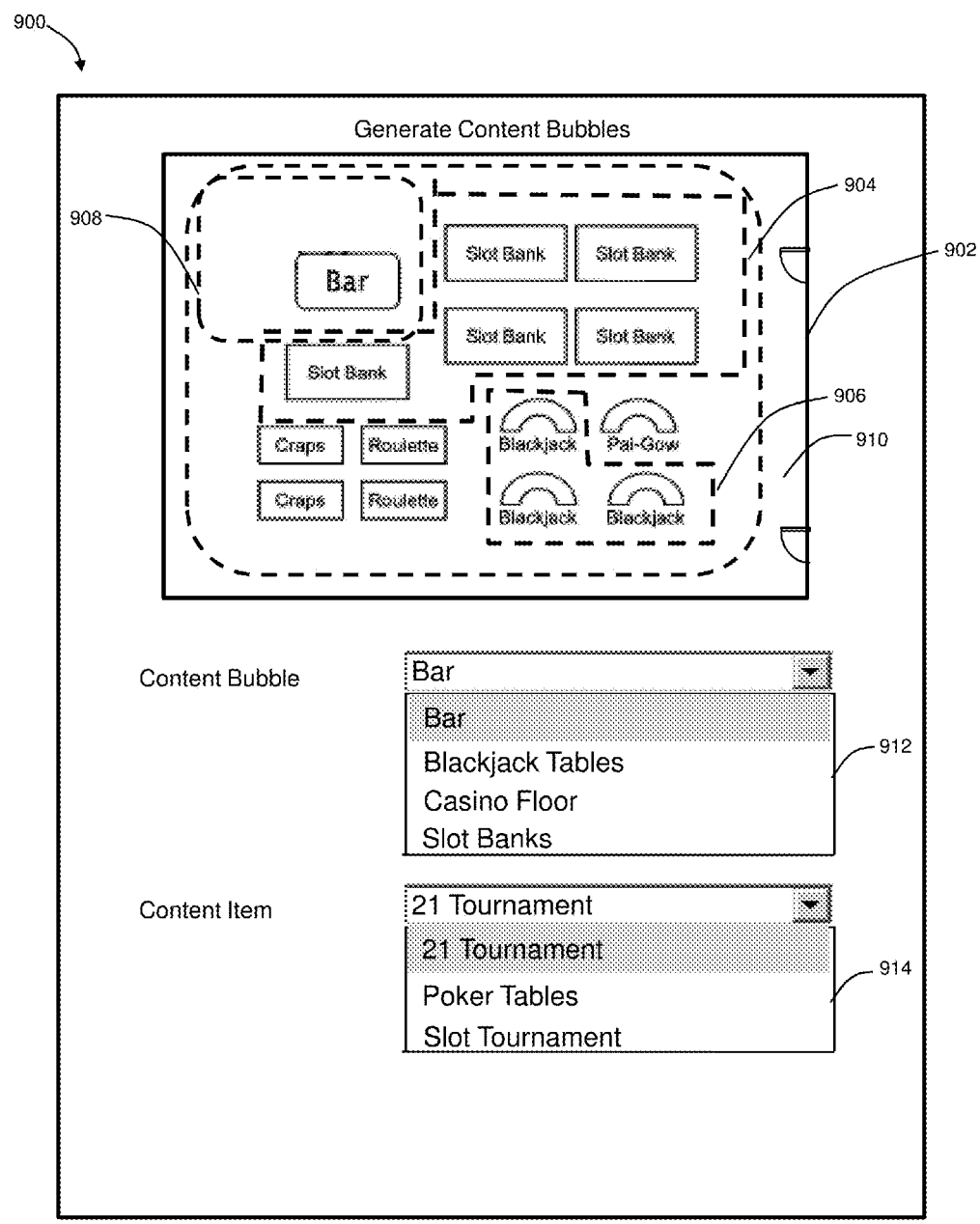
FIG. 9 shows an illustrative content bubble generation interface.

Referring to FIG. 9, an illustrative content bubble generation interface 900 is shown. The content administrator uses the content bubble generation interface to define one or more sections of the area on or near a merchant premises with which the content administrator wishes to associate content items. The content administrator provides a map 902, such as a premises floor plan, on which the content bubbles will be defined. The map may be provided by uploading an image file to the content administrator interface. Multiple content bubbles may be defined for a single merchant area. The content bubbles may overlap.

In FIG. 9, content bubbles 904, 906, 908 and 910 have been defined, corresponding to the Slot Banks area, the Blackjack Tables area, the Bar area, and the entire Casino Floor, respectively. The interface comprises a Content Bubble selection drop down menu 912 and a Content Item selection drop down menu 914. Content bubble 908 corresponding to the bar area has been selected from Content Bubble menu 912. The content administrator has chosen from Content Item menu 914 the content item 21 Tournament. The information entered in the interface shown in FIG. 8 is used to determine which users will receive the content items designated in menu 914. In FIG. 8B, the content item 21 Tournament was associated with a user having a user attribute indicating a preference for blackjack. Because this content item has been associated with content bubble 908 (the Bar area), when a user having the blackjack preference moves into the Bar content bubble, the user will receive the 21 Tournament content item.

Figure 10:
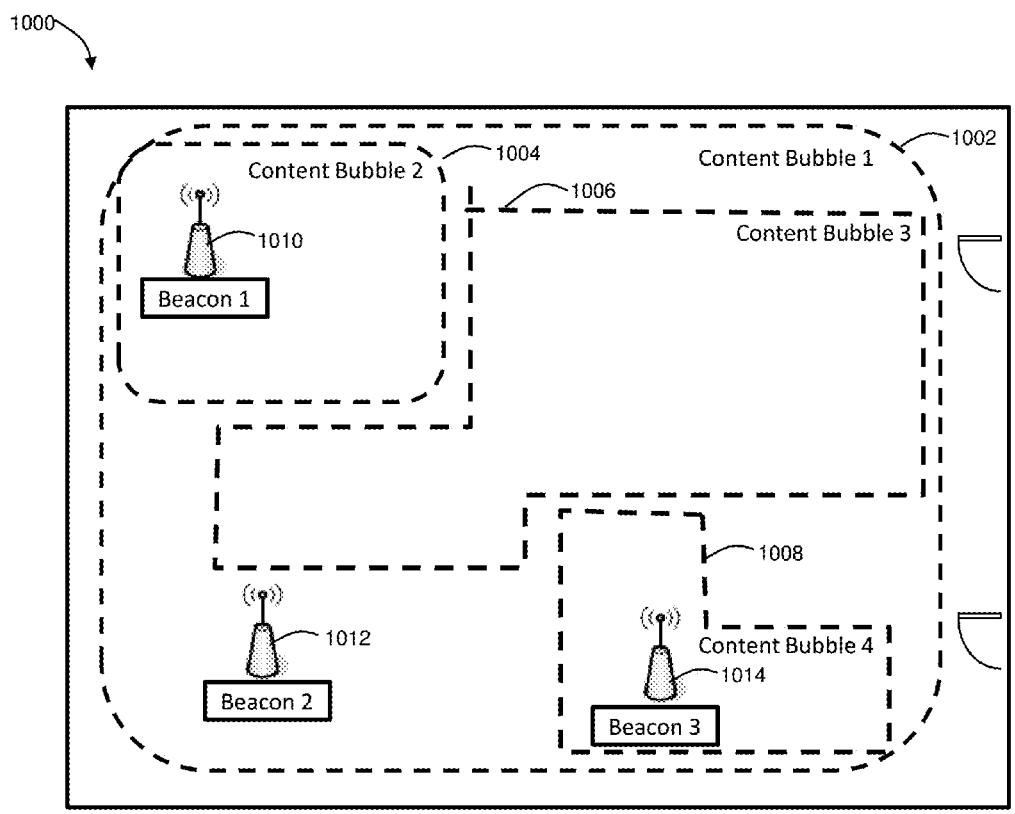
FIG. 10 shows an illustrative content bubble layout showing the placement of a plurality of network objects.

Referring to FIG. 10, an illustrative content bubble layout 1000 with network object placements is shown. Content bubbles 1, 2, 3 and 4 are shown at 1002, 1004, 1006, and 1008, respectively. Network object 1010 is Beacon 1, located within the boundary of Content Bubbles 1 and 2. Network object 1012 is Beacon 2, located within the boundary of Content Bubble 1. Network object 1014 is Beacon 3, located within Content Bubbles 1 and 4.

Referring now to FIGS. 11A-11E, illustrative examples of wireless handset positions as determined from received signals are shown. The tables of FIGS. 11A-11E indicate the determined position of a wireless handset relative to the content bubbles shown in FIG. 10.

In FIGS. 11A-11B, the position of the wireless handset is determined according to the maximum signal strength received from the beacons detected by the wireless handset. In FIG. 11A, the wireless handset has received signals from Beacons 1, 2 and 3 having signal strengths of −45 dB, −50 dB, and −60 dB respectively. Because Beacon 1, shown at 1010 in FIG. 10, has the greatest signal strength as received at the wireless handset, the wireless handset is determined to be within Content Bubble 2. Because Content Bubble 1 comprises nearly all of the premises shown in FIG. 10, the wireless handset is also determined to fall within Content Bubble 1. The wireless handset may receive content associated with the bounded areas indicated by Content Bubbles 1 and 2.

In FIG. 11B, the wireless handset has received signals from Beacons 1, 2 and 3 having signal strengths of −45 dB, −50 dB, and −45 dB respectively. Because the wireless handset has received the same signal strength from both Beacon 1 and Beacon 3, none of the beacons has a highest signal strength. In this case, the wireless handset is determined to be at a location which is an average distance between the two beacons having the greatest signal strength. The wireless handset will be determined to be at a location which is the arithmetical average of the latitudes and longitudes of Beacon 1 and Beacon 3. The wireless handset is thus determined to be located within Content Bubble 3, as Content Bubble 3 includes a position located halfway between Beacons 1 and 3. The wireless handset is also located within Content Bubble 1, as content bubble 1 comprises nearly all of the premises shown in FIG. 10.

In FIGS. 11C-11D, the position of the wireless handset is determined by comparing the strength of beacon signals received at the wireless handset to a threshold signal level, such as −50 dB. The threshold signal level may also be a level in the range of −40 dB to −60 dB, or, in some embodiments a threshold level in the range of −20 dB to −70 dB may be used. In FIG. 11C, the wireless handset has received signals from Beacons 1, 2 and 3 having signal strengths of −45 dB, −60 dB, and −55 dB respectively. Assuming a threshold signal level of −50 dB, only the signal from Beacon 1 exceeds the threshold. Because Beacon 1, shown at 1010 in FIG. 10, has the only signal exceeding the threshold level, the wireless handset is determined to be within Content Bubble 2. Because Content Bubble 1 comprises nearly all of the premises shown in FIG. 10, the wireless handset is also determined to fall within Content Bubble 1.

In FIG. 11D, the wireless handset has received signals from Beacons 1, 2 and 3 having signal strengths of −55 dB, −55 dB, and −55 dB respectively. Assuming a threshold signal level of −50 dB, none of the signals received from Beacons 1, 2 and 3 exceed the threshold signal level. Thus, the position of the wireless handset relative to the content bubbles shown in FIG. 10 cannot be determined and the wireless handset is determined to be located within none of Content Bubbles 1, 2, 3 and 4. The wireless handset may not receive content items associated with the boundaries represented by Content Bubbles 1, 2, 3 and 4.

In some embodiments, the position of the wireless handset is determined by a combination of maximum received signal strength and threshold signal level. For example, the position may be determined according to a maximum received signal strength, provided the maximum received signal strength exceeds the threshold level. This approach is applied in FIG. 11E, in which the wireless handset has received signals from Beacons 1, 2 and 3 having signal strengths of −25 dB, −30 dB, and −25 dB respectively. Assuming a threshold signal level of −50 dB, none of the signals received from Beacons 1, 2 and 3 exceed the threshold signal level. Thus, the position of the wireless handset relative to the content bubbles shown in FIG. 10 cannot be determined and the wireless handset is determined to be located within none of Content Bubbles 1, 2, 3 and 4. In another embodiment, the position of the wireless handset may be determined according to a maximum received signal strength only if none of the received signals exceed a threshold signal level.

Figure 12:
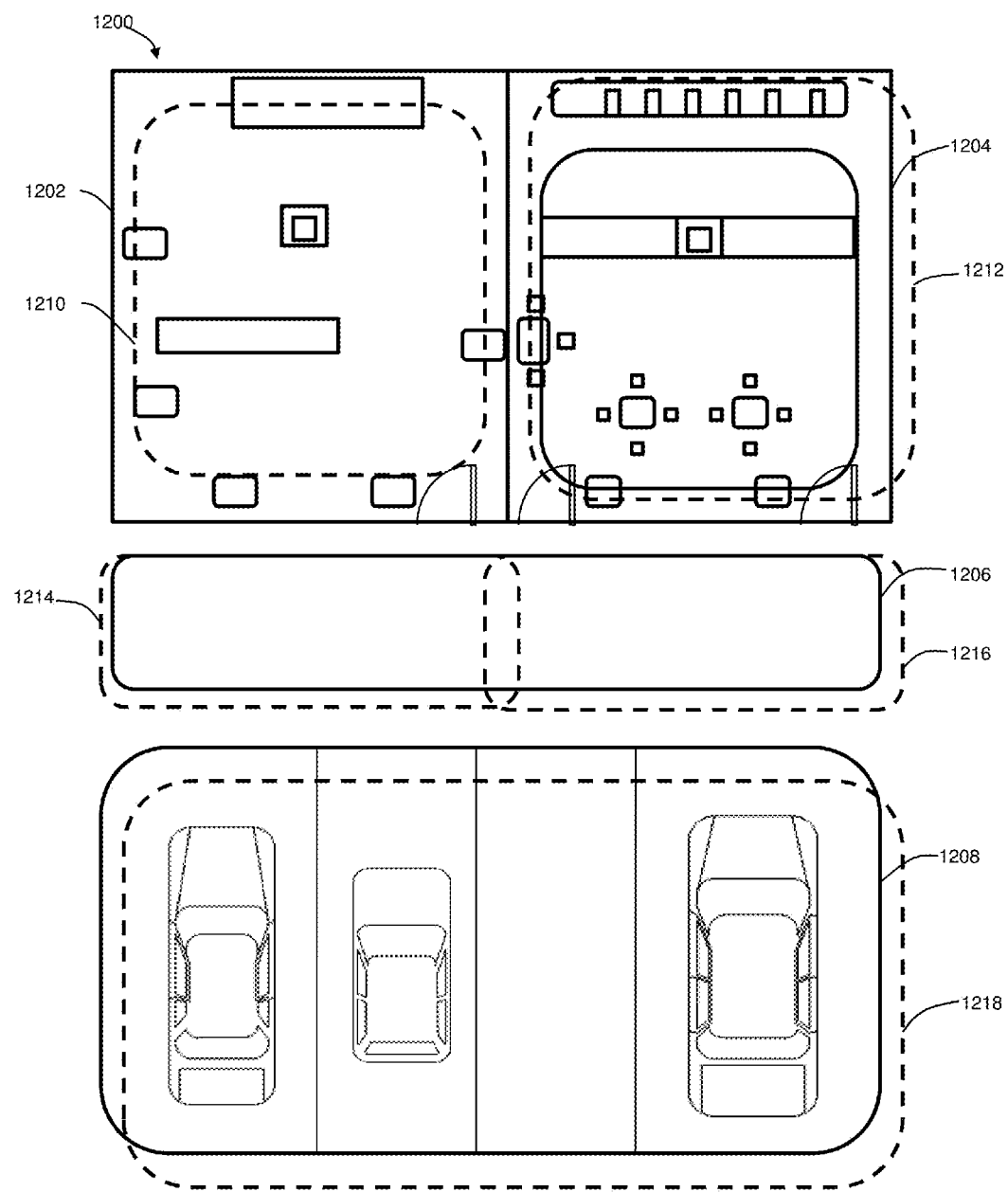
FIG. 12 shows an illustrative content bubble layout showing content bubble designations for exterior and interior spaces.

Referring to FIG. 12, an illustrative content bubble layout 1200 showing content bubble designations for exterior and interior spaces is shown. In some embodiments, the merchant may wish to provide content to users who have not yet entered a merchant premises. In FIG. 12, a content administrator has defined content bubbles surrounding parking lot and sidewalk areas proximate to the merchant premises. The map in FIG. 12 indicates a retail space 1202, a food and beverage space 1204, a sidewalk 1206 that is proximate to the retail and food and beverage space entries, and a parking lot 1208 proximate to the sidewalk. Content bubbles have been defined for the retail space and the food and beverage space as shown at 1210 and 1212, respectively. Content bubble 1214 has been defined for the sidewalk space in front of retail space 1202 and content bubble 1216 has been defined for the sidewalk space in front of food and beverage space 1204. A content bubble 1218 has been defined for the parking lot area 1208.

Figure 13:
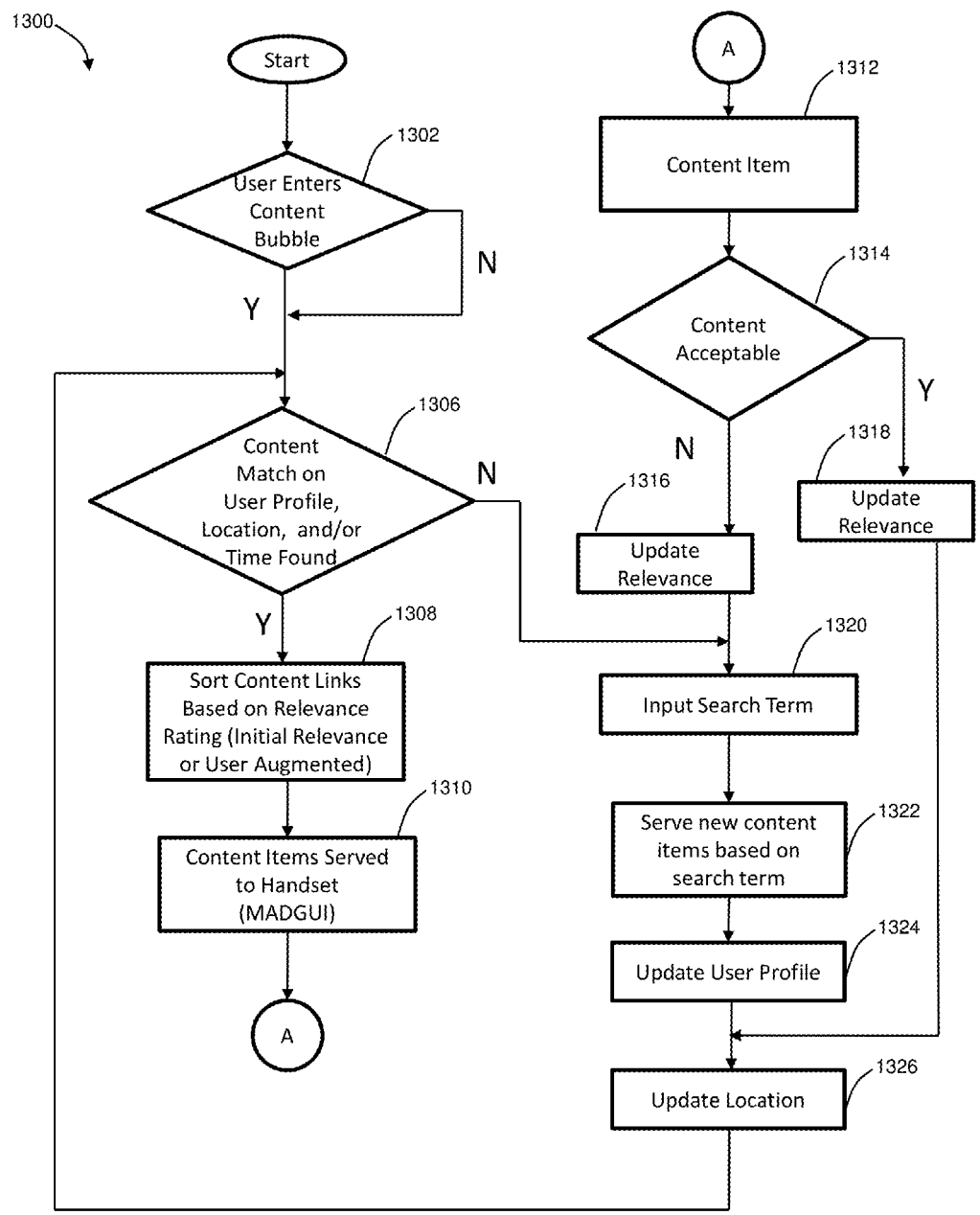
FIG. 13 shows a flow chart illustrating a method for delivering content to a user.

Referring now to FIG. 13, a flow chart 1300 illustrating a method for delivering content to a user is shown. The method begins at decision diamond 1302, in which the handset application running on wireless handset 108 continually sends the user location to server 104 and the server determines whether the user location corresponds to the area within a content bubble.

User location relative to a content bubble may be determined as described with reference to FIGS. 6A-6B. User location may alternatively be determined by global positioning system (GPS) coordinates or signal strength from known regional wireless access points as detected by wireless handset 108.

If the user has entered a content bubble, the handset sends the user ID and location to the server. The content delivery application running on server 104 may use one or more of the location, the local time at the user location, and the user group attributes associated with the user ID to determine which content to deliver to the handset, as shown at decision diamond 1306. If no content matches are found, the user may be prompted to input a search term as indicated at block 1320, allowing the user to find relevant results.

There may be a maximum number of content items desired to be displayed on the handset. The maximum number may be determined by the content administrator or by the handset user. If the number of content matches found exceeds the number of content items to be displayed, the content delivery application may sort through the content matches to find the most relevant matches, as shown at block 1308. In some embodiments, content matches will only be displayed when a relevance value exceeds a threshold value, for example 0.5 on a scale of zero to 1. The relevance value may be based on an initial relevance value set by a content administrator. The relevance value may be updated in accordance with user feedback.

At block 1310, the selected content matches are sent from server 104 to the MADGUI running on wireless handset 108. The method continues to block 1312, in which a user selects a content item. The user may be presented with an option to provide feedback on the content item, as indicated at decision diamond 1314. User feedback may be provided via a ranking system. For example, the user may be provided with the option to rate the content item on a scale of one to five stars. The user may also be provided with the option to reject or accept the content item. In some embodiments, data on the acceptability of the content provided to the user is collected without active input of the user, for example, by tracking clickthrough rates on the content items served. The content acceptability feedback is used to update the relevance value for the content item, as indicated at blocks 1316 and 1318.

If the content is deemed acceptable, the method proceeds to update the location of the handset as indicated at block 1326.

If the content is deemed unacceptable or receives a low user rating, the user may be prompted to input a search term as indicated at block 1320, allowing the user to find preferable results. The method then proceeds to block 1322, in which new content items are served based on the results of the search performed using the entered search term. A user attribute may be added to the user profile based on the search term input by the user, as indicated at block 1324. The method then proceeds to block 1326, at which point the handset sends an updated user location to the server. The server performs a new content search based on the updated location, as indicated at decision diamond 1306.

Figures 14A, 14B:
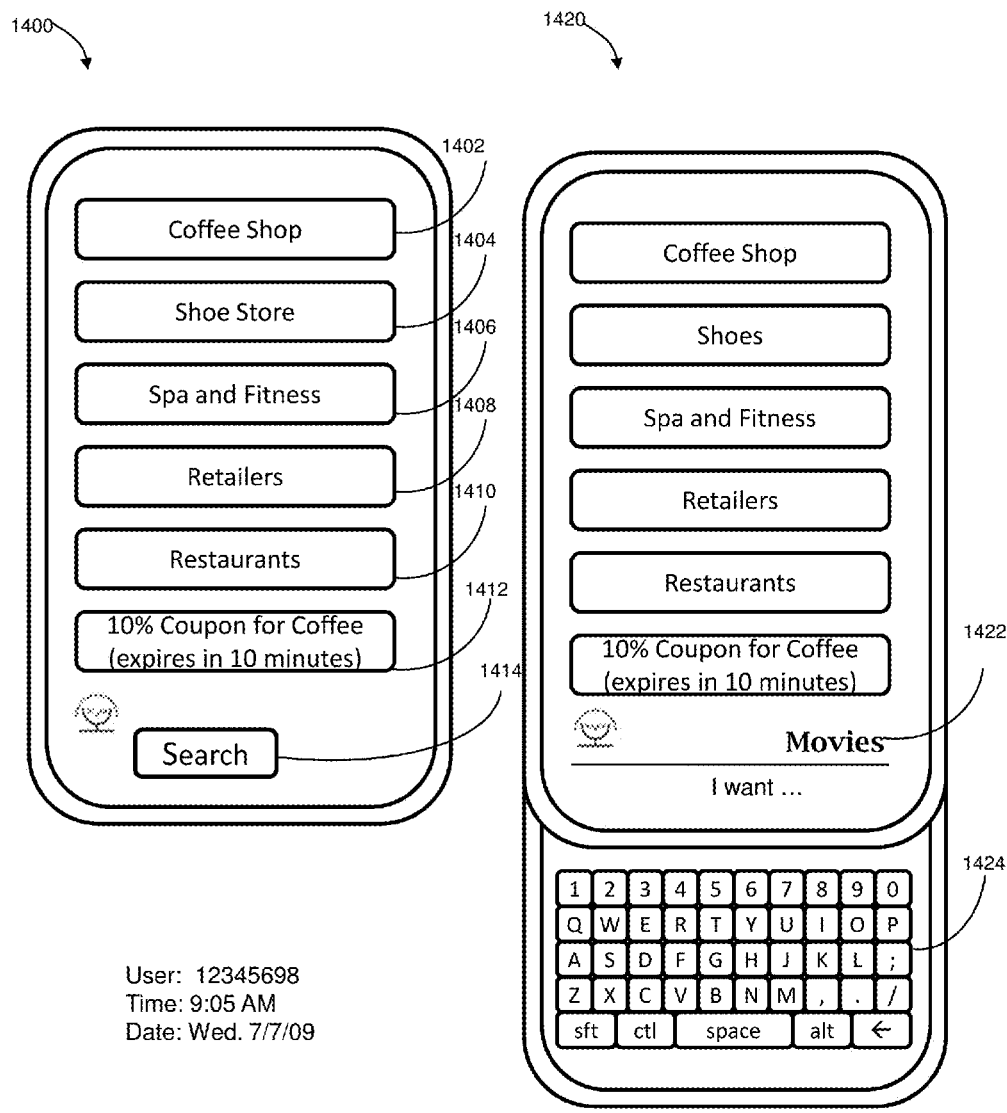
FIGS. 14A-14D shows an illustrative content interface.

Referring to FIG. 14A, an illustrative content interface (MADGUI) is shown on a wireless handset. The handset shown is a slide phone having a retractable keypad, however, the wireless handset may be a bar-type or flip-type phone or a phone having a touchscreen interface. The MADGUI is initiated by the handset application when content matches are found as indicated in decision diamond 1306. When content matches are found, the MADGUI is populated with content matches sent from server 104. The server delivers content to the user based on the content item-user attribute associations and other filters the content administrator has specified. Wireless handset display 1400 shows Coffee Shop 1402, Shoe Store 1404, Spa and Fitness 1406, Retailers 1408, Restaurants 1410, and a 10% Coupon for Coffee 1412.

The user may have received Coupon 1412 based on a preference expressed in a user attribute. Alternatively, the Coupon may have been received based on the time of day that the user is accessing the MADGUI. For example, the content administrator may have specified that a coffee coupon is to be provided between the hours of 9 AM and 1 PM. Finally, the Coupon may have been received based on a combination of a user profile preference and another filter such as a time filter. Similarly, the other MADGUI items may be based on a user attribute-content item association provided by a content administrator, a filtering association, or a combination of user attribute and filter association with a content item.

If the user selects Restaurants 1410, the user may be provided with a submenu of restaurants in the vicinity of the user. The list of Restaurants may be filtered based on user attributes or based on the past behavior of the user. If the user selects Spa and Fitness 1406, the user may receive a submenu of services available from the Spa. The submenu of services may be filtered to include only those services the user has engaged previously. The submenu may include a coupon for a particular service or a service engaged previously.

Referring to FIG. 14B, an illustrative MADGUI prompting a user to input a search item is shown. The user may be prompted to or choose to input a search item, for example, by being shown or hitting a search button such as the button shown at 1414 in FIG. 14A, if none of the content items delivered in the MADGUI are acceptable. In FIG. 14B, the user has entered the search term "Movies" at 1422. The user may use keypad 1424 to enter the search term. Other wireless handsets may allow search term entry using the handset's numeric keypad, touchscreen keypad, or other input device. The MADGUI application will perform a search of merchant content items applicable to the search term and present content to the user based on the results of the search.

Figures 14C, 14D:
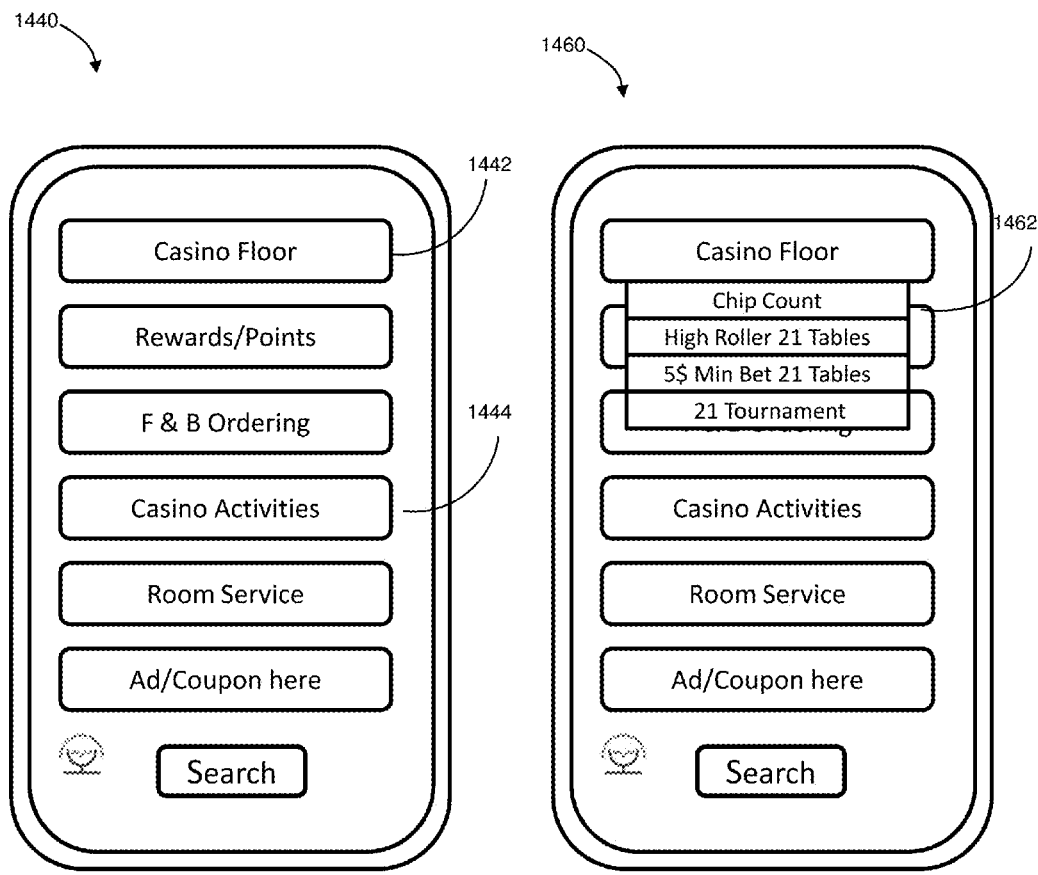

In FIG. 14C, an illustrative MADGUI presented to a user later in the day is shown. The content administrator has specified that content items such as Casino Floor 1442 and Casino Activities 1444 should be shown to the user, for example, between noon and midnight.

In FIG. 14D, an illustrative MADGUI with submenu deployed is shown. As a result of the user selecting item 1442, "Casino Floor," a submenu 1462 has been deployed. Because the user 12345678 has an age exceeding 21, content item Casino Floor may be delivered to the user's wireless handset due to the content connection established as shown in FIG. 8B. If the user has indicated an interest in blackjack, the user may also receive the content item 21 Tournament due to the content connection established as shown in FIG. 8B. The user may also receive the content item 21 Tournament if the user's wireless handset detects that the user is in the content bubble corresponding to the Bar due to the content connection established as shown in FIG. 8B. Whether the user will receive the content item may depend on factors such as the relevance weighting for the content item relative to other content items which match the user's attributes. As FIG. 14D indicates, the user has received the content item Casino Floor. The level 1 content item Casino Floor was established as the parent of level 2 content item "21 Tournament" as shown in FIG. 14D. 21 Tournament appears as a content item in submenu 1462 after the parent content item Casino Floor is selected.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for determining the location of a wireless device and communicating content to the wireless device, the system comprising:
    a merchant premises map;
    a plurality of beacons located on the merchant premises map, wherein each beacon transmits a beacon identifier;
    a beacon signal strength associated with each beacon, wherein the beacon signal strength is determined by the wireless device;
    a networked positioning module communicatively coupled to the wireless device, wherein the networked positioning module receives the beacon identifier and the beacon signal strength corresponding to the wireless device;
    at least one sensor located on the merchant premises map, wherein the sensor receives the beacon identifier and the sensor captures a measured sensor beacon signal strength, the sensor communicatively coupled to the networked positioning module; and
    the networked positioning module receives the beacon identifier and the measured sensor beacon signal strength from the sensor;
    the networked positioning module uses the beacon identifier and the measured sensor beacon signal strength to generate a plurality of calculated signal strength values for at least one beacon identifier; and
    the networked positioning module determines the location of the wireless device by comparing the beacon identifier and the beacon signal strength communicated by the wireless device with the calculated signal strength values generated by the networked positioning module for the beacon identifier.

2. The system of claim 1 further comprising a plurality of indoor geofences that are located on the merchant premises map, wherein at least one geofence includes some of the calculated signal strength values; and
 a plurality of content items, in which at least one content item is associated with at least one indoor geofence that includes some of the calculated signal strength values.

3. The system of claim 2 further comprising at least one user attribute associated with each content item.

4. The system of claim 3 further comprising a first list of targeted content items associated with a first user profile that is presented on a first wireless device, wherein the first list of targeted content items corresponds to a first user attribute and a particular indoor geofence;
 a second list of targeted content items associated with a second user profile presented on a second wireless device, wherein the second list of targeted content items corresponds to a second user attribute and the particular indoor geofence; and
 wherein the first list of targeted content items presented on the first wireless device is different from the second list of targeted content items presented on the second wireless device at the particular indoor geofence, when the first user attribute is different from the second user attribute.

5. The system of claim 3 further comprising a user feedback input for the content item so that when a content item receives a positive user feedback, the ranking of the content item improves in the list of targeted content items and generates an updated list of targeted content items that is delivered to users that share at least one user attribute.

6. The system of claim 3 further comprising a time range that is associated with a content item, which presents the content item within the corresponding time range.

7. The system of claim 3 further comprising a search input that receives a search term, in which the content items that include the search term are presented on the wireless device and the search term is used to update the user profile with a user attribute corresponding to the search term.

8. A system for determining the location of a wireless device and communicating content to the wireless device, the system comprising:
 a merchant premises map;
 a plurality of beacons located on the merchant premises map, wherein each beacon transmits a beacon identifier;
 a beacon signal strength associated with each beacon, wherein the beacon signal strength is determined by the wireless device;
 a networked positioning module communicatively coupled to the wireless device, wherein the networked positioning module receives the beacon identifier and the beacon signal strength corresponding to the wireless device;
 at least one sensor located on the merchant premises map, wherein the sensor receives the beacon identifier and the sensor captures a measured sensor beacon signal strength, the sensor communicatively coupled to the networked positioning module; and
 the networked positioning module receives the beacon identifier and the measured sensor beacon signal strength from the sensor;
 the networked positioning module uses the beacon identifier and the measured sensor beacon signal strength to generate a plurality of calculated signal strength values for at least one beacon identifier;
 the networked positioning module determines the location of the wireless device by comparing the beacon identifier and the beacon signal strength communicated by the wireless device with the calculated signal strength values generated by the networked positioning module for the beacon identifier;
 a plurality of indoor geofences that are located on the merchant premises map, wherein at least one geofence includes some of the calculated signal strength values;
 a plurality of content items, in which at least one content item is associated with at least one indoor geofence that includes some of the calculated signal strength values; and
 at least one user attribute associated with each content item.

9. The system of claim 8 further comprising a first list of targeted content items associated with a first user profile that is presented on a first wireless device, wherein the first list of targeted content items corresponds to a first user attribute and a particular indoor geofence;
 a second list of targeted content items associated with a second user profile presented on a second wireless device, wherein the second list of targeted content items corresponds to a second user attribute and the particular indoor geofence; and
 wherein the first list of targeted content items presented on the first wireless device is different from the second list of targeted content items presented on the second wireless device at the particular indoor geofence, when the first user attribute is different from the second user attribute.

10. The system of claim 9 further comprising a user feedback input for the content item so that when a content item receives a positive user feedback, the ranking of the content item improves in the list of targeted content items and generates an updated list of targeted content items that is delivered to users that share at least one user attribute.

11. The system of claim 9 further comprising a time range that is associated with a content item, which presents the content item within the corresponding time range.

12. The system of claim 9 further comprising a search input that receives a search term, in which the content items that include the search term are presented on the wireless device and the search term is used to update the user profile with a user attribute corresponding to the search term.

13. A method for determining the location of a wireless device and communicating content to the wireless device, the system comprising:
 receiving a merchant premises map;
 locating on the merchant premises map a plurality of beacons, wherein each beacon transmits a beacon identifier;
 enabling a wireless device to determine a received beacon signal strength associated with each beacon detected by the wireless device;
 communicating the beacon identifier and the received beacon signal strength from the wireless device to a networked positioning module;
 locating on the merchant premises map at least one sensor that receives at least one beacon identifier and a measured sensor beacon signal strength for each beacon detected by the sensor;

communicating the beacon identifier detected by the sensor and the measured sensor beacon signal strength for each beacon detected by the sensor to the networked positioning module;

enabling the networked positioning module to use the beacon identifier and the measured sensor beacon signal strength to generate a plurality of calculated signal strength values for at least one beacon identifier;

enabling the networked positioning module to determine the location of the wireless device by comparing the beacon identifier and the beacon signal strength communicated by the wireless device with the calculated signal strength values generated by the networked positioning module for the beacon identifier.

14. The method of claim 13 further comprising locating a plurality of indoor geofences on the merchant premises map, wherein at least one geofence includes some of the calculated signal strength values; and associating at least one content item with at least one indoor geofence that includes some of the calculated signal strength values.

15. The method of claim 14 further comprising associating at least one user attribute with each content item.

16. The method of claim 15 that comprises ranking the content items based on user feedback to the list of targeted content items so that when a content item receives positive feedback, the content item receives an improved ranking in an updated list of targeted content items that is delivered to users that share at least one user attribute.

17. The method claim 15 further comprising presenting a first list of targeted content items associated with a first user profile on a first wireless device, wherein the first list of targeted content items corresponds to a first user attribute and a particular indoor geofence;

presenting a second list of targeted content items associated with a second user profile on a second wireless device, wherein the second list of targeted content items corresponds to a second user attribute and the particular indoor geofence; and wherein the first list of targeted content items presented on the first wireless device is different from the second list of targeted content items presented on the second wireless device at the particular indoor geofence, when the first user attribute is different from the second user attribute.

18. The method of claim 16 that comprises ranking the content items based on user feedback to the list of targeted content items so that when a content item receives positive feedback, the content item receives an improved ranking in an updated list of targeted content items that is delivered to users that share at least one user attribute.

19. The method of claim 16 that comprises associating a time range with a content item, which presents the content item within the corresponding time range.

20. The method of claim 16 that includes receiving a search term, in which the content items that include the search term are presented on the wireless device and the search term is used to update the user profile with a user attribute corresponding to the search term.

* * * * *